US006798995B2

(12) United States Patent
Nagata

(10) Patent No.: US 6,798,995 B2
(45) Date of Patent: Sep. 28, 2004

(54) MACHINE MANAGING METHOD, MACHINE MANAGED BY SUCH METHOD, MACHINE MANAGING DEVICE, MACHINE MANAGING SYSTEM, AND MACHINE MANAGING PROGRAM

(75) Inventor: Masaya Nagata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 10/112,878

(22) Filed: Apr. 2, 2002

(65) Prior Publication Data

US 2002/0159777 A1 Oct. 31, 2002

(30) Foreign Application Priority Data

Apr. 2, 2001 (JP) ..................................... 2001-103938

(51) Int. Cl.[7] ............................................. G03G 15/00
(52) U.S. Cl. .......................................................... 399/8
(58) Field of Search ............................................. 399/8

(56) References Cited

U.S. PATENT DOCUMENTS

| | | | | |
|---|---|---|---|---|
| 5,812,874 A | * | 9/1998 | Yamashita et al. ............. | 399/8 |
| 6,023,593 A | * | 2/2000 | Tomidokoro ................... | 399/8 |
| 6,032,001 A | * | 2/2000 | Miyawaki ...................... | 399/8 |
| 6,275,664 B1 | * | 8/2001 | Wolf et al. .................... | 399/8 |
| 6,366,741 B1 | * | 4/2002 | Fukushima ..................... | 399/8 |
| 6,487,377 B2 | * | 11/2002 | Naito et al. .................... | 399/8 |
| 6,629,134 B2 | * | 9/2003 | Hayward et al. ............... | 399/8 |
| 2002/0077979 A1 | | 6/2002 | Nagata ........................ | 705/40 |

FOREIGN PATENT DOCUMENTS

| | | |
|---|---|---|
| JP | 7-239825 A | 9/1995 |
| JP | 8-152814 A | 6/1996 |
| JP | 8-211792 A | 8/1996 |
| JP | 8-315052 A | 11/1996 |
| JP | 9-120238 A | 5/1997 |
| JP | 10-69139 A | 3/1998 |
| JP | 2000-194767 A | 7/2000 |

* cited by examiner

*Primary Examiner*—Fred Braun
(74) *Attorney, Agent, or Firm*—Birch, Stewaart, Kolasch & Birch, LLP

(57) ABSTRACT

A terminal of a service provider is characterized in that it includes: a storage unit for registering unique information on a machine of a contract signer; a communications unit for detecting information on a remaining amount of a consumable article in the machine via telephone lines as a network; and a processing unit for making an instruction to dispatch a new machine to the contract signer if the remaining amount of the consumable article has reached a specified value. A comprehensive and essential service is provided covering from sales to continuous use of the machine, by which consumable articles are managed, replaced, and collected without requiring any work done by machine users or any financial burden borne by manufacturers selling the machine.

55 Claims, 17 Drawing Sheets

FIG. 4 (a) CONTRACT SIGNER TABLE [1]

| CONTRACT SIGNER ID NO. | NAME OF CONTRACT SIGNER | TYPE | DEPT. | LOCATION | EMAIL ADDRESS | PHONE NO. | DATE OF CONTRACT | METHOD OF PAYMENT | ... |
|---|---|---|---|---|---|---|---|---|---|
| 000001 | ABC CO. LIMITED. | BUSINESS | GENERAL AFFAIRS DEPT. | | | | | | |
| 000002 | LMN CO. LIMITED. | BUSINESS | | | | | | | |
| 000003 | XYZ CO. LIMITED. | BUSINESS | AAA DIV. | | | | | | |
| 000004 | XYZ CO. LIMITED. | BUSINESS | BBB DIV. | | | | | | |
| 000005 | YAMADA TARO | PRIVATE | | | | | | | |
| ... | | | | | | | | | |

FIG. 4 (b) CONTRACT SIGNER TABLE [2]

| CONTRACT SIGNER ID NO. | MACHINE ID NO. | | | | ... |
|---|---|---|---|---|---|
| | MACHINE COVERED BY CONTRACT 1 | MACHINE COVERED BY CONTRACT 2 | MACHINE COVERED BY CONTRACT 3 | MACHINE COVERED BY CONTRACT 4 | |
| 000001 | 00000001 | N.A. | N.A. | N.A. | |
| 000002 | 00000002 | 00000003 | N.A. | N.A. | |
| 000003 | 00000004 | 00000001 | N.A. | N.A. | |
| 000004 | 00000005 | N.A. | N.A. | N.A. | |
| 000005 | 00000006 | N.A. | N.A. | N.A. | |
| ... | | | | | |

FIG. 4 (c) CONTRACT SIGNER TABLE [3]

| CONTRACT SIGNER ID NO. | MACHINE COVERED BY CONTRACT 1 | MACHINE COVERED BY CONTRACT 2 | MACHINE COVERED BY CONTRACT 3 | MACHINE COVERED BY CONTRACT 4 | ... |
|---|---|---|---|---|---|
| 000001 | CR-2000 | – | – | – | |
| 000002 | CR-2000(1) | CR-2000(2) | – | – | |
| 000003 | CR-2000 | CR-2001 | – | – | |
| 000004 | CR-2000 | – | – | – | |
| 000005 | CR-2000 | – | – | – | |
| ... | | | | | |

FIG. 5 (a)
UNIQUE INFORMATION MANAGING TABLE

| UNIQUE INFORMATION (ID NO.) | FAMILY INFORMATION | CONTRACT SIGNER ID |
|---|---|---|
| 00000001 | COLOR INK JET PRINTER CR-2000 | 00001 |
| 00000002 | COLOR INK JET PRINTER CR-2000 | 00002 |
| 00000003 | COLOR INK JET PRINTER CR-2000 | 00002 |
| 00000004 | COLOR INK JET PRINTER CR-2000 | 00003 |
| 00000005 | COLOR INK JET PRINTER CR-2000 | 00004 |
| ... | ... | ... |
| 01000001 | COLOR INK JET PRINTER CR-2001 | 00003 |
| ... | ... | ... |
| 02000001 | COLOR INK JET PRINTER CR-2002 | ... |
| ... | ... | |

FIG. 5 (b)
UNIQUE INFORMATION MANAGING TABLE

| UNIQUE INFORMATION (ID NO.) | FAMILY INFORMATION | CONTRACT SIGNER ID |
|---|---|---|
| 00000001 | COLOR INK JET PRINTER CR-2000 | |
| 00000002 | COLOR INK JET PRINTER CR-2001 | |
| 00000003 | COLOR INK JET PRINTER CR-2000 | |
| 00000004 | COLOR INK JET PRINTER CR-2001 | |
| 00000005 | COLOR INK JET PRINTER CR-2000 | |
| 00000006 | COLOR INK JET PRINTER CR-2001 | |
| 00000007 | COLOR INK JET PRINTER CR-2001 | |
| 00000008 | COLOR INK JET PRINTER CR-2001 | |
| 00000009 | COLOR INK JET PRINTER CR-2000 | |
| 00000010 | COLOR INK JET PRINTER CR-2000 | |
| 00000011 | COLOR INK JET PRINTER CR-2001 | |
| 00000012 | COLOR INK JET PRINTER CR-2000 | |
| ... | ... | |

FIG. 6 (a)

IN-USE MACHINE TABLE

CONTRACT SIGNER ID: 000001

| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|
| NOT AVAILABLE | NOT AVAILABLE | NOT AVAILABLE | NOT AVAILABLE | NOT AVAILABLE | NOT AVAILABLE | NOT AVAILABLE | NOT AVAILABLE |

FIG. 6 (b)

MACHINE MANAGING TABLE

CONTRACT SIGNER ID: 000001

DATE: 2000/3/21

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|---|
| 1 | NOT AVAILABLE | NOT AVAILABLE | NOT AVAILABLE | NOT AVAILABLE | NOT AVAILABLE | NOT AVAILABLE | NOT AVAILABLE | NOT AVAILABLE |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 7 (a)
IN-USE MACHINE TABLE

| CONTRACT SIGNER ID | 000001 | | | | | |
|---|---|---|---|---|---|---|
| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| COLOR INK JET PRINTER | CR-2000 | 00000001 | - | - | - | 2000/3/22 | 2000/3/22 |

FIG. 7 (b)
MACHINE MANAGING TABLE

| CONTRACT SIGNER ID | 000001 | | | | | DATE | 2000/3/23 | |
|---|---|---|---|---|---|---|---|---|
| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| 1 | COLOR INK JET PRINTER | CR-2000 | 00000001 | - | - | - | 2000/3/22 | 2000/3/22 |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 8 (a)

IN-USE MACHINE TABLE

CONTRACT SIGNER ID: 000001

| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|
| COLOR INK JET PRINTER | CR-2000 | 00000001 | - | - | - | 2000/3/22 | 2000/3/22 |

FIG. 8 (b)

MACHINE MANAGING TABLE

CONTRACT SIGNER ID: 000001

DATE: 2000/6/8

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|---|
| 1 | COLOR INK JET PRINTER | CR-2000 | 00000001 | 2000/6/7 | - | - | 2000/3/22 | 2000/3/22 |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 9 (a)

IN-USE MACHINE TABLE

| CONTRACT SIGNER ID | 000001 | | | | | |
|---|---|---|---|---|---|---|
| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| COLOR INK JET PRINTER | CR-2000 | 00000001 | - | - | - | 2000/3/22 | 2000/3/22 |

FIG. 9 (b)

MACHINE MANAGING TABLE

| CONTRACT SIGNER ID | 000001 | | | | | | DATE | 2000/6/9 |

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|---|
| 1 | COLOR INK JET PRINTER | CR-2000 | 00000001 | 2000/6/7 | - | - | 2000/3/22 | 2000/3/22 |
| 2 | COLOR INK JET PRINTER | CR-2000 | 00000040 | | 2000/6/8 | | - | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 10 (a)

IN-USE MACHINE TABLE

| CONTRACT SIGNER ID | 000001 | | | | | |
|---|---|---|---|---|---|---|
| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| COLOR INK JET PRINTER | CR-2000 | 00000040 | – | – | – | 2000/6/9 | 2000/6/12 |

FIG. 10 (b)

MACHINE MANAGING TABLE

| CONTRACT SIGNER ID | 000001 | | | | | DATE | 2000/6/10 |

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|---|
| 1 | COLOR INK JET PRINTER | CR-2000 | 00000001 | 2000/6/7 | – | 2000/6/9 | 2000/3/22 | 2000/3/22 |
| 2 | COLOR INK JET PRINTER | CR-2000 | 00000040 | | 2000/6/8 | | 2000/6/9 | – |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 11 (a)

IN-USE MACHINE TABLE

| CONTRACT SIGNER ID | 000001 | | | | | |
|---|---|---|---|---|---|---|
| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| COLOR INK JET PRINTER | CR-2000 | 00000040 | - | 2000/6/8 | - | 2000/6/9 | 2000/6/12 |

FIG. 11 (b)

MACHINE MANAGING TABLE

| CONTRACT SIGNER ID | 000001 | | | | | DATE | |
|---|---|---|---|---|---|---|---|
| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| 1 | COLOR INK JET PRINTER | CR-2000 | 00000001 | | | | 2000/3/22 | 2000/3/22 |
| 2 | COLOR INK JET PRINTER | CR-2000 | 00000040 | 2000/6/7 | 2000/6/8 | 2000/6/9 | 2000/6/9 | 2000/6/12 |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |

FIG. 12

ACCOUNT LIST [1]  (PERIOD: 03.16.2000 – 04.15.2000)

CONTRACT SIGNER ID: 000125

| No. | MACHINE COVERED | DATE CHARGED | QUANTITY | UNIT PRICE | SUM |
|---|---|---|---|---|---|
| 1 | CR-2000 | 2000/3/22 | 1 | △△△△. △ | △△△△. △ |
| GRAND SUM | | | | | △△△△. △ |

ACCOUNT LIST [2]  (PERIOD: 04.16.2000 – 05.15.2000)

CONTRACT SIGNER ID: 000125

| No. | MACHINE COVERED | DATE CHARGED | QUANTITY | UNIT PRICE | SUM |
|---|---|---|---|---|---|
| 1 | NONE | | | | 0 |
| GRAND SUM | | | | | 0 |

ACCOUNT LIST [3]  (PERIOD: 05.16.2000 – 06.15.2000)

CONTRACT SIGNER ID: 000125

| No. | MACHINE COVERED | DATE CHARGED | QUANTITY | UNIT PRICE | SUM |
|---|---|---|---|---|---|
| 1 | CR-2000 | 2000/6/12 | 1 | △△△△. △ | △△△△. △ |
| GRAND SUM | | | | | △△△△. △ |

FIG. 15 (a)
IN-USE MACHINE TABLE

| CONTRACT SIGNER ID | 000001 | | | | | | | |
|---|---|---|---|---|---|---|---|---|
| MACHINE INFORMATION <1> | MACHINE INFORMATION <2> | UNIQUE INFORMATION | CUMULATIVE VALUE | SPECIFIED VALUE | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
| COLOR INK JET PRINTER | CR-2000 | 00000001 | Da | Dc | - | - | - | 2000/3/22 | 2000/3/22 |

FIG. 15 (b)
MACHINE MANAGING TABLE

CONTRACT SIGNER ID: 000001     DATE: 2000/6/8

| No. | MACHINE INFORMATION <1> | MACHINE INFORMATION <2> | UNIQUE INFORMATION | CUMULATIVE VALUE | SPECIFIED VALUE | DATE OF DETECTING NEAR-EMPTINESS | DATE OF DISPATCHING REPLACEMENT | DATE OF COLLECTION | DATE OF REGISTRATION | DATE OF NETWORK CONNECTION CONFIRMATION |
|---|---|---|---|---|---|---|---|---|---|---|
| 1 | COLOR INK JET PRINTER | CR-2000 | 00000001 | Da | Dc | 2000/6/7 | - | - | 2000/3/22 | 2000/3/22 |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |
| 11 | | | | | | | | | | |

FIG. 16 (a)
IN-USE MACHINE TABLE

CONTRACT SIGNER ID: 000001

| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | PROVISIONAL / FORMAL REGISTRATION | DATE OF NETWORK CONNECTION CONFIRMATION |
|---|---|---|---|---|---|---|---|---|
| COLOR INK JET PRINTER | CR-2000 | 00000040 | - | - | - | 2000/6/9 | PROVISIONAL REGISTRATION | 2000/8/12 |

FIG. 16 (b)
MACHINE MANAGING TABLE

CONTRACT SIGNER ID: 000001         DATE: 2000/6/10

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | PROVISIONAL / FORMAL REGISTRATION | DATE OF NETWORK CONNECTION CONFIRMATION |
|---|---|---|---|---|---|---|---|---|---|
| 1 | COLOR INK JET PRINTER | CR-2000 | 00000001 | 2000/6/7 | - | 2000/6/9 | 2000/3/22 | FORMAL REGISTRATION | 2000/3/22 |
| 2 | COLOR INK JET PRINTER | CR-2000 | 00000040 | | 2000/6/8 | | 2000/6/9 | PROVISIONAL REGISTRATION | - |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |

FIG. 17 (a)

IN-USE MACHINE TABLE

CONTRACT SIGNER ID: 000001

| MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | PROVISIONAL / FORMAL REGISTRATION | DATE OF NETWORK CONNECTION CONFIRMATION |
|---|---|---|---|---|---|---|---|---|
| COLOR INK JET PRINTER | CR-2000 | 00000040 | - | - | - | 2000/6/9 | CANCELLED | 2000/6/12 |

FIG. 17 (b)

MACHINE MANAGING TABLE

CONTRACT SIGNER ID: 000001        DATE: 2000/6/10

| No. | MACHINE INFORMATION <1> | MACHINE INFORMATION <2> | UNIQUE INFORMATION | DATE OF DETECTING NEAR-EMPTINESS | DATE OF DISPATCHING REPLACEMENT | DATE OF COLLECTION | DATE OF REGISTRATION | PROVISIONAL / FORMAL REGISTRATION | DATE OF NETWORK CONNECTION CONFIRMATION |
|---|---|---|---|---|---|---|---|---|---|
| 1 | COLOR INK JET PRINTER | CR-2000 | 00000001 | 2000/6/7 | - | | 2000/3/22 | FORMAL REGISTRATION | 2000/3/22 |
| 2 | COLOR INK JET PRINTER | CR-2000 | 00000040 | | 2000/6/8 | 2000/6/9 | 2000/6/9 | CANCELLED | - |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |

MACHINE MANAGING METHOD, MACHINE MANAGED BY SUCH METHOD, MACHINE MANAGING DEVICE, MACHINE MANAGING SYSTEM, AND MACHINE MANAGING PROGRAM

FIELD OF THE INVENTION

The invention relates to methods of managing machines which contain a consumable article and associated machine managing systems, and preferably to methods of managing, as well as dispatching and replacing image forming devices, such as copying machines and printers, which need toner, ink, or other consumables.

BACKGROUND OF THE INVENTION

Copying machines, printers, and other image forming devices relying on toner, ink, and other consumable articles (consumables) for operation require refiling with consumable articles and other maintenance work for their continuous use. Conventionally, for convenience in the maintenance work, toner, ink, etc. are packed in a cartridge (consumable goods) so that a supplemental consumable article can be actually supplied by replacing the cartridge.

In these machines which rely on replacements of consumable goods for continuous use, the user of the machines buys consumable goods in advance and keeps them in stock to avoid running out of them and causing the machine inoperable.

However, managing consumable goods are so complex that, for example, Japanese Laid-open Patent Publication 8-315052 (Tokukaihei 8-315052/1996, published on Nov. 29, 1996) and Japanese Laid-open Patent Publication 2000-194767 (Tokukai 2000-194767, published on Jul. 14, 2000) disclose methods to reduce the workload of the machine user.

Each of the conventional techniques relates to a system in which there is provided an automatic ordering terminal device which stores inventory information about toner and other consumable articles, calculates the supply quantity of the toner, etc. in reference to the information about the toner, etc. given by the machine, and automatically places orders with a supplier for supplemental supplies for those articles that are running out, by facsimile, email, or the like.

Both methods, nevertheless, work only with the replacing of consumable goods in a machine. Although each of the methods can reduce the workload of the machine user by automating the management of, for example, the remaining amounts and ordering of consumable articles, the machine user still has to replace by him/herself in many cases, which is especially true with consumable goods in an image forming device for general consumer use. The maintenance work is far from automatic.

The user will likely get dirty hands from replacing toner, ink, and other consumable goods and install a wrong cartridge or a correct one, but, in a wrong position, especially when the user has to replace two or more cartridges as in a color copying machine.

Increasing numbers of consumed goods, e.g., ink cartridges, are being recycled by manufacturers. Consumers or machine users' cooperation is necessary on top of that of manufacturers to promote such a recycling system. For example, the manufacturer has prepared collecting boxes, but it is left to the machine user to carry ink cartridges to the collecting boxes. The machine user still has to trouble him/herself a lot, when it is taken into account where the user is located and how often the user uses the machine. Collection services are provided in which a service provider makes a visit to each user's home to ease the inconvenience. No such operations are successfully run in the black, since the products involved are relatively cheap consumable goods. Large financial burdens are borne by manufactures and recycle service providers.

SUMMARY OF THE INVENTION

The present invention has an objective to provide a comprehensive and essential service, covering from sales to continuous use of the machine, by which consumable goods are managed and when used up, replaced and collected without requiring any work done by machine users or any financial burden borne by manufacturers.

A machine managing method in accordance with the present invention, to achieve the objective, is a machine managing method of managing a machine for a service receiver and is characterized in that it causes a programmed computer to execute the steps of:

obtaining unique information on the machine by which the machine is identified and information on a remaining amount of a consumable article used in the machine and subsequently determining whether or not the remaining amount of the consumable article has reached a specified value; and if the remaining amount has reached the specified value, making an instruction to dispatch a new machine to the service receiver who matches the unique information on the machine.

In the configuration, the present invention is directed not to the management of consumable goods like cartridges filled with toner, ink, etc., but to the management of machines themselves as device main bodies which operate using a consumer article and/or consumable article contained in the consumable goods installed in the machines. For example, the management of the present invention covers copying machines and laser printers which use toner as recording material, ink jet printers which use ink as recording material, and facsimile devices which use a rolled film of heat-sensitive material or heat-sensitive paper as recording material.

With the configuration the machine to be managed is assigned with unique information on the machine by which the machine is identified; therefore, machines are easily managed using the machines' unique information, telling which machine has been delivered to which service receiver. Further, by obtaining the unique information on the machine and the information on the remaining amount of a consumable article used in the machine, it becomes easier to know what the current remaining amount is of the consumable article in any given machine delivered to any given service receiver.

Therefore, the machines to be managed can be arbitrarily managed using the unique information on the machines; if, for example, the machines are manufactured on an OEM basis, and the unique information on the machines is managed without separating those OEM products from internally manufactured products, it becomes easier to service only the internally manufactured ones. It also becomes easier to selectively service only those machines manufactured in a certain period.

The present invention manages machines. Therefore, the unique information assigned to the machines can be constituted by a relatively little information.

Specifically, to manage ink cartridges, toner cartridges, and other consumable articles through unique information assigned to the consumable articles as in conventional cases, a vast amount of unique information needs be managed, since the number of consumable articles far exceeds the number of machines. Even when using a computer to conduct a search for unique information or other information based on the unique information, the process is too resource-intensive and takes an extended period of time for computers with old specifications, which is inconvenient. In addition, increased amounts of data require a memory or the like with large storage space for the data, which leads to increased costs of the consumable articles to which the memory is attached.

Besides, when the consumable article is modified for better performance or other purposes, new numbers need be assigned to distinguish the old version from the new one, which further increases the amount of unique information that has to be managed.

In contrast, the present invention can greatly reduce the amount of the unique information to be managed and requires a memory with far less storage space for the unique information. As a result, machine managing devices having such a memory attached thereto can be manufactured at less costs.

If the consumable article to be installed in the machine is upgraded for better performance, since it is a machine manager (service provider) who installs the consumable article in the machine, by adding information on the installed consumable article to a managing table by which the machine is managed upon, for example, the installation of the consumable article in the machine, the information on the consumable article installed in the machine can be confirmed in reference to the managing table, and conventional unique information can be utilized as it is, without changing the unique information assigned to the machine.

As described in the foregoing, amounts of information assigned as unique information (for example, the number of digits or another resource) can be restrained. Therefore, consumption of resources can be restrained, and possible exhaustion of resources in the future can be prevented.

Further, it is determined based on the information obtained on the remaining amount of a consumable article whether or not the remaining amount has reached a specified value, and if the specified value has been reached, an instruction is made to, for example, a managing, dispatch, or other related division of the service provider to dispatch a new machine to the service receiver identified by the unique information on the machine. Thereby, a machine managing service can be offered to the service receiver in which the service receiver does not have to do any management work as to the consumable article and it is ensured that the consumable article never runs out.

Moreover, when the remaining amount of the consumable article has reached a specified value, the whole machine is replaced, which frees the service receiver from bothersome work of replacing the consumable article.

Further, if the obtained unique information on the machine is not registered, the machine can be regarded as being illegal, that is, pirated, in which case a warning may be made to eradicate pirated products.

Whether or not the remaining amount of a consumable article used in the machine of the service receiver has reached a specified value may be determined in various ways including those which follow.

A first example is to transmit, when the machine of the service receiver configured including an ink remaining amount sensor or other remaining-amount-detecting unit detects a near-emptiness level as a reference value to which the sensor is set, information of such contents to the machine managing device of the present invention, so that the machine managing device receives the information. Further, the machine managing device can determine, based on an operation to receive the information, that the remaining amount of the consumable article in the machine has reached a specified value, as long as the machine transmits the information to the machine managing device for no other purposes than to inform that the near-emptiness level has been reached. Incidentally, the remaining amount in the machine may be detected, besides by means of a sensor and other hardware configuration, by calculating the consumption of ink from print data every time a print job is performed. The former is advantageous in that the remaining amount detected is accurate and the latter in that the device configuration can be simplified.

Next, when the machine and the machine managing device are allowed to be always connected to a network, the machine managing device can perform the aforementioned software detection of the remaining amount, in which case, all the remaining-amount-detecting functions are omitted from the machine, and the machine can therefore configured more simply in terms of hardware/software. Specifically, when the machine performs a print job, information on ink consumption according to print data is transmitted to the machine managing device. Here, the information on ink consumption is, for example, print data contents per se. However, the printed contents may be a secret, in which case an operation is preferably performed in which the print data contents are made to make no sense by, for example, changing the sequence of the print data, so as to prevent any third part from using the print data. Incidentally, in the operation, the print data may be compressed too to the extent that the calculation of ink consumption for actual print data is not affected. Thus, the communications load on the network can be reduced, and so can the processing load on the processing unit in the machine managing device.

Incidentally, in a case of a color printer, the information on ink consumption is preferably calculated for each color. In such a situation, the machine may transmit print data which is made to make no sense as mentioned earlier, without separating the print data for each color, and separate the print data for each color in the machine managing device to calculate ink consumption for each color; alternatively, the machine may first separate the information for each color before transmission to the machine managing device. In terms of printing principles, the machine is equipped with functions to separate print data for each color: for example, C (cyan), M (magenta), Y (yellow), and K (black), and in some cases supplemental colors including a photographic yellow and a light cyan. Therefore, the objective can be accomplished easily by using information obtained with ordinary functions. Paying attention to that the machine loses no color information during the transmission of the information, the remaining amount of ink of each color can be calculated by the machine managing device.

A variation is for a machine equipped with an ink-remaining-amount-detecting function to transmit the current remaining amount of ink to the machine managing device continuously, for every print job, or for every certain period of time. This allows information to be transmitted even when the remaining amount of ink has not reached a specified value, and the machine managing device must determine whether or not the remaining amount of ink has reached a specified value. However, irrespective of whether the remaining amount of ink has reached a specified value, the current status of the machine regarding the remaining amount of ink can be frequently checked, and the machine managing device can more surely monitor the information on the remaining amount of ink. This is a very effective method especially when the machine managing device fails to receive correctly due to a network or other communications error despite that the machine has transmitted that the remaining amount of ink has reached a specified value, or when data is lost regarding the remaining amount of ink due to trouble of the machine managing device, because of increased opportunities to make confirmation.

In this case, whether the remaining amount of ink has reached a specified value can be determined in the following fashion. When the machine is equipped with hardware which functions to detect by a binary manner whether the specified value has been reached, information is transmitted according to the following rules:

"The remaining amount of ink is more than or equal to the specified value." → The bit provided to represent the remaining amount of ink is "0."

"The remaining amount of ink is less than the specified value." → The bit provided to represent the remaining amount of ink is "1."

Then the machine managing device detects a change in the value of the received data. Hence, the point in time can be detected when the remaining amount of ink has reached the specified value. In this case, if the value of the bit provided to represent the remaining amount of ink is managed for each machine, in other words, if a bit information cell is provided in the managing table stored on a hard disk or other storage unit so as to represent the remaining amount of ink for an entry or update of a received value, in the above case, the remaining amount of ink in the machine can be detected as having reached a specified value when the received data changes from "0" to "1."

A further variation is for a machine equipped with a software-based function to detect the remaining amount of ink to transmit the current remaining amount of ink to the machine managing device continuously, for every print job, or for every certain period of time so that the machine managing device can determine weather the specified value has been reached. Similarly to the foregoing, this allows the information to be transmitted even when the remaining amount of ink has not reached the specified value, and therefore, the information on the remaining amount of ink in the machine managing device can be more surely checked. Compared to the previous variation, the detection of the remaining amount of ink is not limited to binary operation but can rely on continuous values.

In other words, providing multiple levels in the remaining amount of ink by means of hardware is difficult for various factors including precision, costs, and reliability. However, software-based calculating method is easy; the cumulative, remaining amount of ink can be calculated only by adding the ink consumption calculated for each printing job to the cumulative ink consumption before the printing job.

Further, it is the machine managing device that determines whether the specified value has been reached; therefore, no determination program (or part of data like comparative values) needs to be installed in the machine. Therefore, when the remaining-amount-detecting program sometime later comes to boast better precision in detecting the remaining amount of ink, a simple method of replacing the program stored on the storage unit in the machine managing device can handle the situation, and the program stored on the machine does not need be updated, offering flexibility in handling the situation.

Incidentally, the algorithm per se to calculate the remaining amount of ink from print data needs be installed on the machine. Considering easy updating of the algorithm per se, as mentioned earlier, the machine managing device preferably handles everything related to the calculation and determination of the remaining amount of ink.

Further, the unique information on the machine and the information on the remaining amount are preferably transmitted from the machine to a computer of the service provider connected to the machine via a network in view of automatic service management. However, the present invention is not particularly limited to this. For example, the unique information on the machine and the information on the remaining amount may be obtained by a communications device which is connected to the machine to be managed via a network and which is communicable with the computer and transmitted by the communications device to the computer. Alternatively, without deviating out of the scope of the invention, the service provider may be informed by some communication means of the unique information on the machine and the information on the remaining amount so that the service provider can manually enter the obtained information in the computer.

As detailed above, according to the configuration, the remaining amount, etc. of consumable articles are managed using information unique to the machine; therefore, it becomes easier to know what the current remaining amount is of the consumable article in any given machine delivered to any given service receiver. Moreover, when the obtained remaining amount of a consumable article has reached a specified value, an instruction is made to dispatch a new machine to the service receiver identified from the unique information on the machine; thereby the service receiver is provided with a service which frees the service receiver from the management of the consumable article and which ensures that the consumable article is never exhausted. If unregistered information is received, it can be determined that the machine is illegal, i.e., pirated, so pirated goods can be eradicated by means of warnings, etc.

In order to achieve the objective, the machine managing method of the present invention is a machine managing method of managing a machine for a service receiver, and characterized in that it causes a programmed computer to execute the steps of:

obtaining unique information on the machine by which the machine is identified and information on a remaining amount of a consumable article used in the machine and subsequently determining whether or not the remaining amount of the consumable article has reached a specified value; and if the remaining amount has reached the specified value, making an instruction to manufacture or fabricate a new machine.

As a result of this, each machine to be managed is assigned with unique information by which the machine is identified, and it becomes easier to match which machine has been delivered to which service receiver, using the unique information on the machine for management. Further, by obtaining the unique information on the machine and the information on the remaining amount of the consumable article used in the machine, it becomes easier to know what the current remaining amount is of the consumable article in any given machine delivered to any given service receiver.

Moreover, it is determined, based on the obtained information on the remaining amount of the consumable article, whether or not the remaining amount has reached a specified value and if the specified value has been reached, a instruction is made to manufacture or fabricate a new machine; therefore, regarding the management of the machines delivered to the service receiver, the service provider can stock a necessary number of machines, and get prepared for dispatch of a new machine to the service receiver identified by the unique information on the machine, without building up a useless inventory. Thus, the service receiver can be provided with a machine managing service which frees the service receiver from the management of the consumable article and which ensures that the consumable article is never exhausted.

As detailed above, according to the configuration, it is determined, based on the obtained information on the remaining amount of the consumable article, whether or not the remaining amount has reached a specified value and if the specified value has been reached, a instruction is made to manufacture or fabricate a new machine; therefore, regarding the management of the machines delivered to the service receiver, the service provider can stock a necessary number of machines, and get prepared for dispatch of a new machine to the service receiver identified by the unique information on the machine, without building up a useless inventory.

In order to achieve the objective, the machine managing method of the present invention is a machine managing method of managing a machine for a service receiver over a network, and is characterized in that it causes a programmed computer to execute the steps of:

obtaining, via a network, unique information on the machine by which the machine is identified and information that a remaining amount of a consumable article used in the machine is in a near-emptiness state; and making an instruction to dispatch a new machine to the service receiver who matches the unique information on the machine, in accordance with execution of the previous step.

According to this, since the information that the remaining amount of a consumable article in the machine is in a near-emptiness state is obtained via a network, the computer of the service provider can extremely easily obtain the unique information on the machine and the information that the remaining amount of a consumable article in the machine is low. Further, without further determining whether the remaining amount of a consumable article in the machine has reached a specified value or doing other processes, an instruction can be made for a dispatch of a new machine only in response to the reception of the information.

Incidentally, the network refers to a network of communications lines, wired or wireless, which enables communications between communications devices equipped with at least communications function. If the network is established by wireless communications, for example, a network of communications lines is configured by relay stations for wireless communications. Therefore, the computer can be accessed by a machine itself having a communications function via telephone lines, the Internet, or dedicated lines and stationary or mobile communications equipment, either built-in or externally mounted to the machine, and any other communications device.

As detailed here, according to the configuration, since the information that the remaining amount of a consumable article in the machine is in a near-emptiness state is obtained via a network, the computer of the service provider can extremely easily obtain the unique information on the machine and the information that the remaining amount of a consumable article in the machine is low. Further, without further determining whether the remaining amount of a consumable article in the machine has reached a specified value or doing other processes, an instruction can be made for a dispatch of a new machine only in response to the reception of the information.

In order to achieve the objective, the machine managing method of the present invention is a machine managing method of managing a machine for a service receiver over a network, and is characterized in that it causes a programmed computer to execute the steps of:

obtaining, via a network, unique information on the machine by which the machine is identified and information that a remaining amount of a consumable article used in the machine is in an near-emptiness state;

making an instruction to manufacture or fabricate a new machine in accordance with execution of the previous step.

According to this, since as explained earlier, the information that the remaining amount of the consumable article in the machine is in a near-emptiness state is obtained via a network, and an instruction is made to manufacture or fabricate a new machine based on reception of the information, the computer of the service provider does not need to determine whether or not the remaining amount of the consumable article in the machine has reached a specified value or do other processes. Therefore, preparation to dispatch a new machine to the service receiver can be done by a more simple process without building an unnecessary inventory.

As detailed here, according to the configuration, since the information that the remaining amount of a consumable article in the machine is in a near-emptiness state is obtained via a network, and an instruction is made to manufacture or fabricate a new machine based on reception of the information, the computer of the service provider does not need to determine whether or not the remaining amount of the consumable article in the machine has reached a specified value or do other processes. Therefore, preparation to dispatch a new machine to the service receiver can be done by a more simple process without building an unnecessary inventory.

In order to achieve the objective, a machine of the present invention is characterized in that it is used with the one of the foregoing machine managing methods.

With one of the machine managing methods applied to the machine, the service provider can enjoy the benefit of easy determination as to whether the service provider has delivered a machine and easy maintenance management. Further, in making the machine always available for use, the service receiver can enjoy the benefit of being freed from the duty to manage the remaining amount of, and replace, a consumable article.

In order to achieve the objective, a storage unit for registering unique information, on a machine to be delivered to a service receiver, by which the machine is identified in association with the service receiver; and a processing unit for determining, when the unique information on the machine and information on a remaining amount of a consumable article used in the machine are obtained, whether or not the remaining amount of the consumable article has reached a specified value and for making, when the remaining amount of the consumable article has reached the specified value, an instruction to dispatch a new machine to the service receiver who matches the unique information on the machine.

According to this, the same functions and effects are achieved as those explained as to the machine managing method executing the steps corresponding to the configuration.

Incidentally, according to a method whereby the information is sent only when the machine detects near-emptiness by itself, the machine managing device can make an instruction to dispatch a new machine only in response to reception of the information. Further, the dispatch instruction may be replaced with an instruction to request manufacture or fabrication of a machine to a machine's manufacturing division.

In order to achieve the objective, a machine managing system of the present invention is a machine managing system for managing a machine for a service receiver over a network, and is characterized in that it includes:

a group including a machine including: a transmission unit for externally transmitting via a network unique information on the machine by which the machine is identified and information that a consumable article used in the machine is in a near-empty state; and a controller unit for controlling the transmission unit; and a machine managing device including: a communications unit for receiving from the group the unique information on the machine and the information that the consumable article is in a near-empty state; a storage unit for registering the unique information on the machine in the group in association with the service receiver; and a processing unit for making, when the information that the consumable article is in a near-empty state is received, an instruction to dispatch a new machine to the service receiver who matches the unique information on the machine.

According to this, the aforementioned machine managing method using near-emptiness information can be executed by means of a network system, remaining amount sensor, and other information technology.

Further, if a pirated version of the machine is in use, the machine operates to transmit the unique information provided to the machine, and by checking the information, those machines whose unique information is not registered on the storage unit in the machine managing device can be eradicated.

In order to achieve the objective, a machine managing system of the present invention is a machine managing system for managing a machine for a service receiver over a network, and is characterized in that it includes:

a group including a machine including: a transmission unit for externally transmitting via a network unique information on the machine by which the machine identified and information on a remaining amount of a consumable article used in the machine; and a controller unit for controlling the transmission unit; and a machine managing device including: a communications unit for receiving from the group the unique information on the machine and the information on the remaining amount; a storage unit for registering the unique information on the machine in the group in association with the service receiver; and a processing unit for determining, when the unique information on the machine and the information on the remaining amount of the consumable article used in the machine are obtained, whether or not the remaining amount of the consumable article has reached a specified value and for making, when the remaining amount of the consumable article has reached the specified value, an instruction to dispatch a new machine to the service receiver who matches the unique information on the machine.

According to this, the aforementioned machine managing method using information on the remaining amount of a consumable article can be executed by means of a network system, remaining amount sensor, and other information technology.

Further, based on a fact that the machine in the group has been connected to a network and the unique information on the machine or the information on the remaining amount has been received, it can be determined that the service receiver has used the machine, that is, the service receiver will be charged. Therefore, the time when either the unique information on the machine or the information on the remaining amount is received can be used as the time when the charging occurs.

In order to achieve the objective, a machine managing program of the present invention is characterized in that it causes a computer to execute the machine managing method.

According to the configuration, by downloading the program, any typical computer can act as a service managing device.

Incidentally, the scope of the present invention naturally covers computer-readable storage media on which a machine managing program to cause a computer to execute the machine managing method of the present invention is recorded.

According to the present invention, a comprehensive and essential service is provided covering from sales to continuous use of the machine, by which consumable articles are managed, replaced, and collected without requiring any work done by machine users or any financial burden borne by manufacturers selling the machine.

For a fuller understanding of the nature and advantages of the invention, reference should be made to the ensuing detailed description taken in conjunction with the accompanying drawings.

BRIEF DESCRIPTION OF DRAWINGS

FIGS. 4(a)–4(c) are drawings showing an example of a contract signer table displayed on an information managing screen.

FIGS. 5(a), 5(b) are drawings showing an example of a unique information managing table displayed on an information managing screen.

FIGS. 6(a), 6(b) are drawings showing an example of a managing table (initial state) made up of a machine table and a machine managing table displayed on an information managing screen.

FIGS. 7(a), 7(b) are drawings showing an example of the managing table (at the time of advance registration) displayed on an information managing screen.

FIGS. 8(a), 8(b) are drawings showing an example of the managing table (at the time of near-emptiness detection) displayed on an information managing screen.

FIGS. 9(a), 9(b) are drawings showing an example of the managing table (after instruction) displayed on an information managing screen.

FIGS. 10(a), 10(b) are drawings showing an example of the managing table (at the time of delivery of a new machine) displayed on an information managing screen.

FIGS. 11(a), 11(b) are drawings showing an example of the managing table (at the time of confirmation of network connection of a new machine) displayed on an information managing screen.

FIG. 12 is a drawing describing a charging method.

FIGS. 15(a), 15(b) are drawings showing an example of the managing table (at the time of determination of a remaining amount) displayed on an information managing screen corresponding to the control activities shown in FIG. 14.

FIGS. 16(a), 16(b) are drawings showing an example of the managing table (at the time of provisional registration) displayed on an information managing screen.

FIGS. 17(a), 17(b) are drawings showing an example of the managing table (at the time of confirmation of cancellation) displayed on an information managing screen.

EMBODIMENTS

The following description will discuss the present invention in detail in reference to drawings.
(Network Configuration and Device Configuration)

Figure 2:
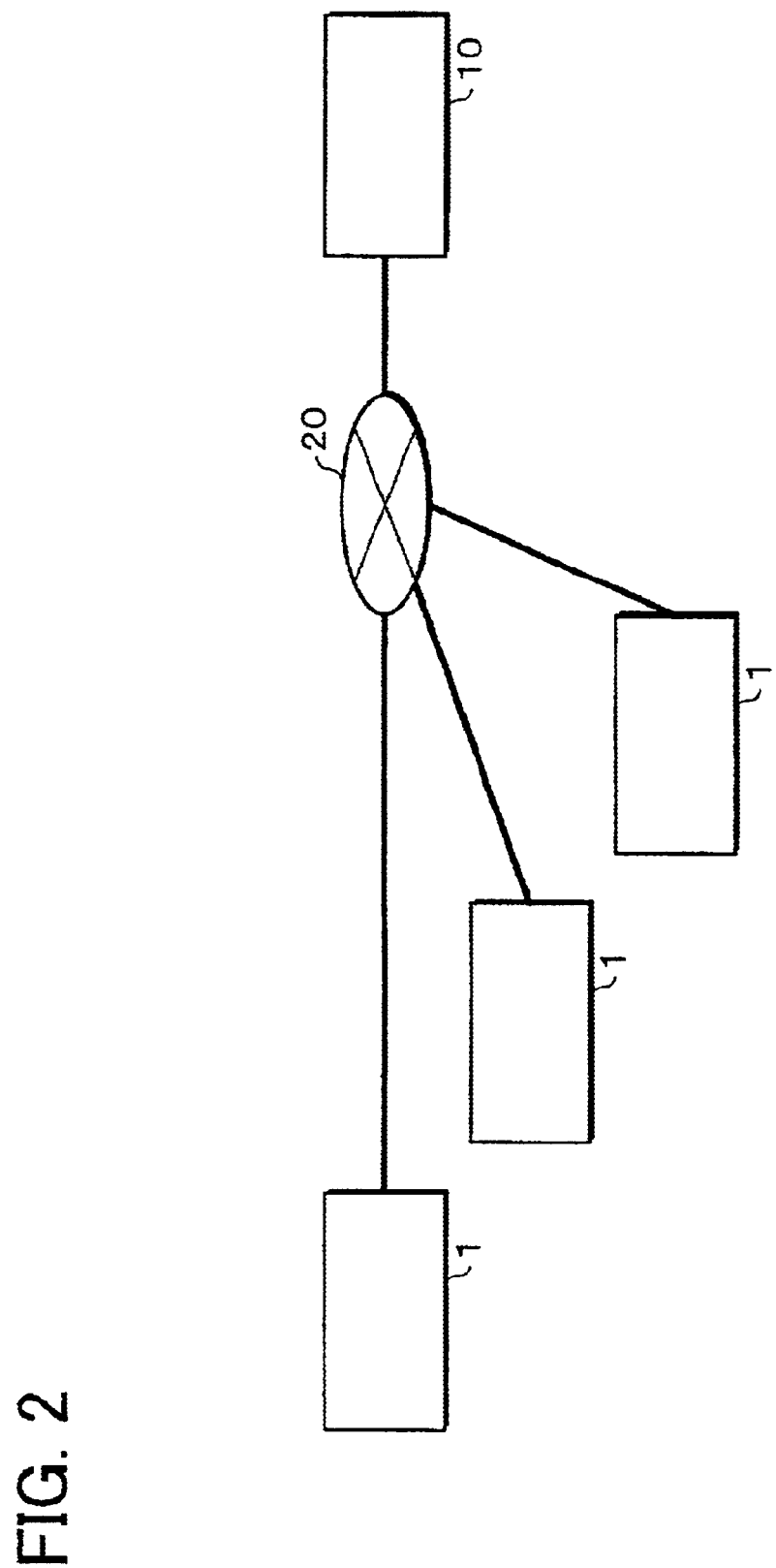
FIG. 2 is an explanatory drawing schematically showing connection of a service managing network system of the present invention.

FIG. 2 illustrates a typical configuration of a network 20 connecting contract signers 1 to a service provider 10.

The service provider 10, for example, provides a service to the contract signer (service receiver) 1 over telephone lines or another public network 20. The service provided is related to a machine 2 (see FIG. 1) and will be detailed in the following, taking a contract signer 1 and a service provider 10 as an example.

Figure 1:
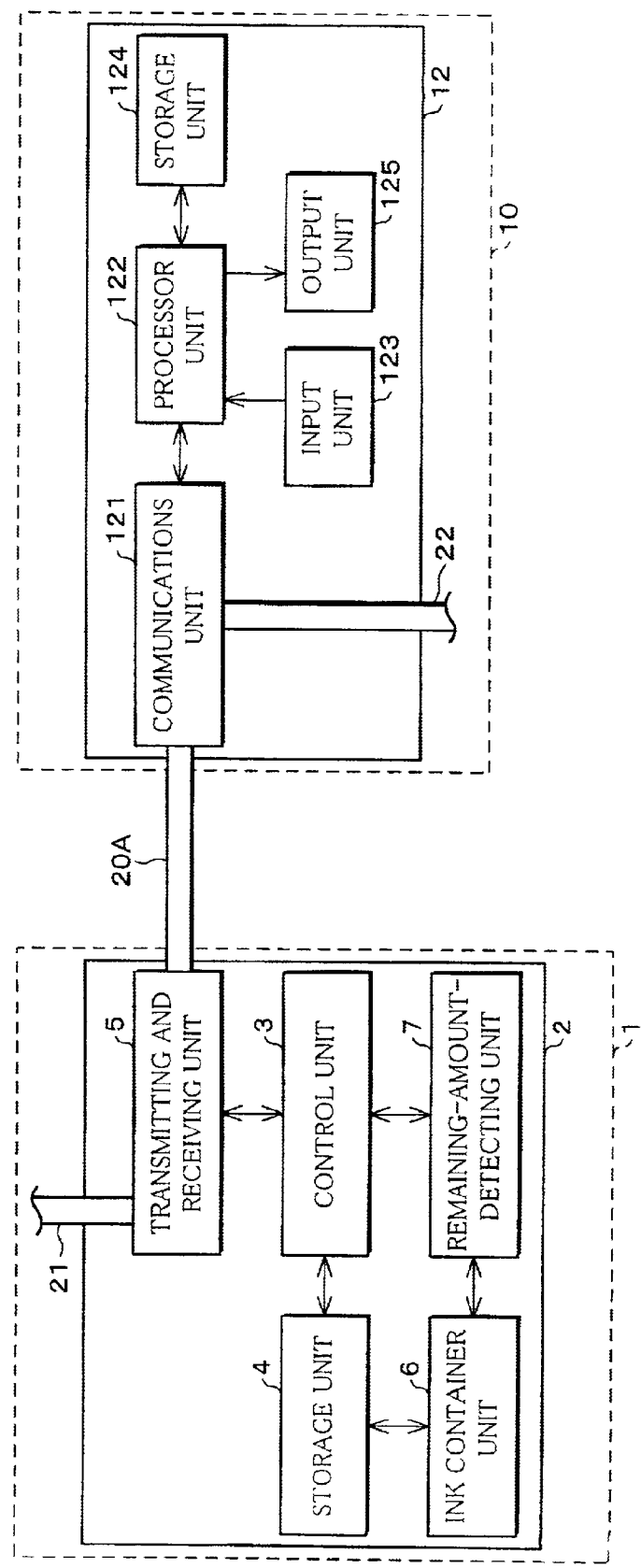
FIG. 1 is a schematic block diagram showing a service managing network system of the present invention.

An image forming device, or machine 2, is delivered by the service provider 10 to the contract signer 1 or purchased by the contract signer 1 by him/herself from a sales company or the like. The machine 2, now owned by the contract signer 1, is connected to a terminal 12 (machine managing device) of the service provider 10 via telephone lines 20A, or a network 20, as shown in FIG. 1.

Now, the description will focus on the configuration of the machine 2 of the contract signer 1. The machine 2 is equipped with: image forming means (not shown); an ink container unit 6 which contains ink as a consumable article (consumables); a storage unit 4 which stores unique information to distinguish between and identify machines 2; a transmitting and receiving unit 5 which sends the unique information and the like to the outside; a remaining-amount-detecting unit 7 constituted by a sensor and related circuitry which detects the amount of remaining ink; and a controller unit 3 which controls the storage unit 4, the transmitting and receiving unit 5, and the remaining-amount-detecting unit 7.

The storage unit 4 may be an EEPROM, ferroelectric memory, or other nonvolatile memory among other examples. Otherwise the storage unit 4 may be storage means provided to store, for example, a program controlling the image forming means; in the present invention, the storage unit 4 typically needs to store nothing more than model and ID numbers (unique information) of the machines 2 (each machine 2 has its unique ID number) and is not necessarily rewritable, and therefore there is no need for large memory space or rich functions.

The transmitting and receiving unit 5 is, for example, a modem and may be connected not necessarily via telephone lines, but also via dedicated lines like a cable television network. Data may be exchanged between the machine 2 and the terminal 12 not necessarily all via cable, but also partially by wireless communications.

Figure 3:
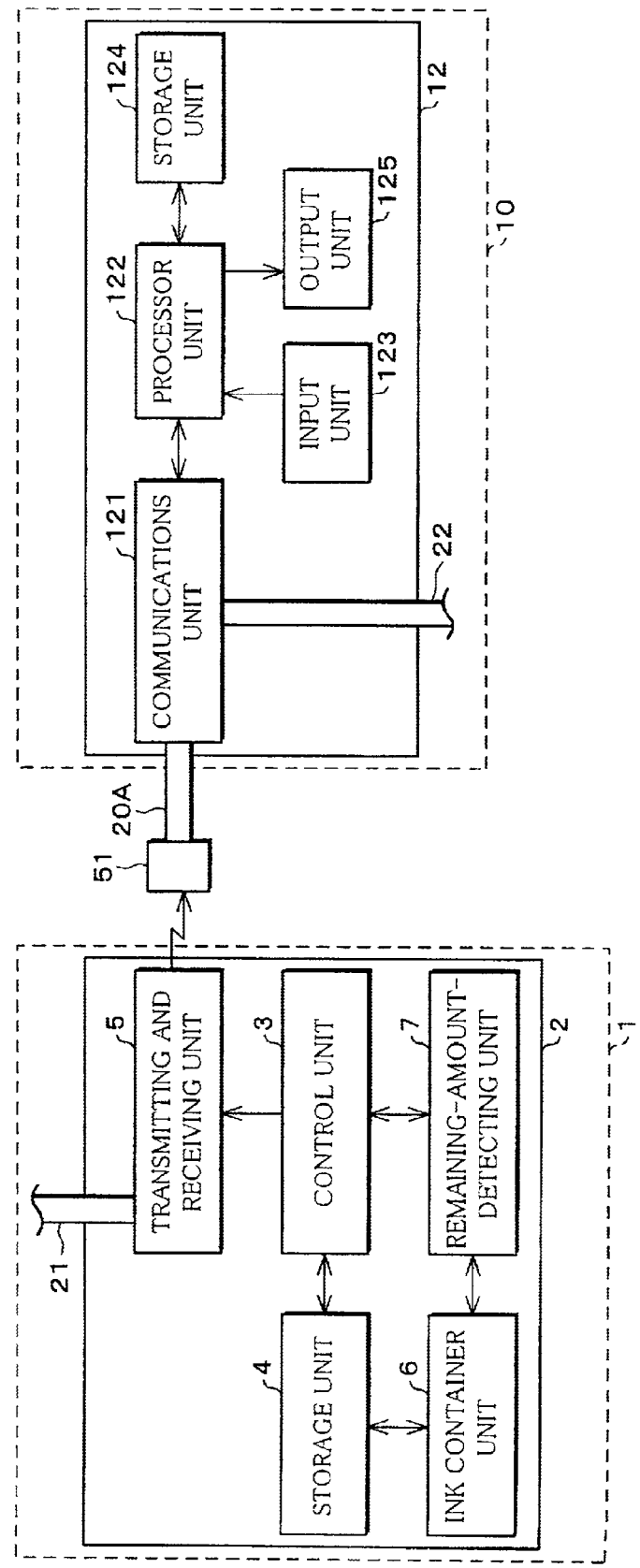
FIG. 3 is a schematic block diagram showing another service managing network system of the present invention.

For example, as shown in FIG. 3, the transmitting and receiving unit 5 mounted or connected to the machine 2 may be connected to a second transmitting and receiving unit 51 installed in the contract signer 1 via wireless communications, and the second transmitting and receiving unit 51 is connected to the telephone lines 20A, or network 20, via physical lines. Also, the transmitting and receiving unit 5 may be capable of connecting to a local network 21.

The remaining-amount-detecting unit 7 is constructed around a remaining amount detecting sensor, installed in the ink container unit 6, which operates in accordance with electric, optical, or other principles, as well as peripheral circuitry, such as a waveform adjusting circuit which adjusts the waveform of a sensor output, a filter circuit, a binarizing circuit, and a voltage level adjusting circuit. Alternatively, the remaining amount may be obtained by adding up amounts of discharged ink calculated from print data for a sum total of consumed ink which is subtracted from the amount filled in advance.

The former method, based on a physical mechanism, can detect the remaining amount of ink more accurately and does not require memory space to store a program to calculate the remaining amount. The latter, software-based solution requires no hardware including the remaining amount detecting sensor and is convenient to device structure simplification, cost reduction, and a shorter manufacturing and fabrication time. FIG. 1 and FIG. 3 show the former.

Incidentally, when a sensor is used to detect the remaining amount of ink, the alarm-triggering threshold is preferably set to a "near empty value" or such a value that after an alarm, the machine 2 can continue printing some more pages before completely running out of ink, allowing for some time for replacement.

The settings serve the purpose of, if the user intends to continuously enjoy the service provided by the present invention, preventing the machine 2 from becoming inoperable due to the exhaustion of the consumable article after the triggering of the alarm until a new machine is delivered, because in the service, the contract signer 1 keeps no inventory or spare consumed goods like replaceable ink cartridges, but a new machine 2 is dispatched based on information that there is little ink remaining and the old machine 2, running out of a consumable article, is collected on delivery of the new machine.

The controller unit 3 determines whether the remaining amount of ink reaches a specified value based on the information on the remaining amount provided by the remaining-amount-detecting unit 7. If the specified value is reached, the controller unit 3 instructs the storage unit 4 and the transmitting and receiving unit 5 as follows.

When, for example, the machine 2 connects to the telephone lines 20A and establishes a communication channel with the terminal 12, the controller unit 3 accesses and instructs the storage unit 4 to read the ID number of the machine 2 (hereinafter, will be referred to as unique information) and also the transmitting and receiving unit 5 to externally transmit the read-out where necessary. Further, the controller unit 3 monitors signals from various sensors to make predetermined instructions according to the signals. In image forming devices including a CPU for overall device controls, the CPU may serve as the controller unit 3.

Now, the description will shift its focus on information contents recorded on the machine 2. The storage unit 4 in the machine 2 stores a figure (e.g., "00111233") in advance as unique information by which the machines 2 are individually identified. The figure may have more or less digits. The figure is typically provided during the manufacturing process under the management of the service provider 10.

If the machine 2 is manufactured by a person or entity, while the service is provided by another, the unique information may not be provided during the manufacture with the unique information on the machine 2 manually stored on the storage unit 4 by the service provider 10 on the delivery of the machine 2 (detailed later). In such an event, the machine 2 is equipped with: input means to input the unique information; means to confirm and register the input; means to display the unique information input; means to change the unique information input; means to redisplay the unique information input, etc. where necessary.

FIGS. 5(a), 5(b) show the unique information recorded as a unique information managing table in the terminal 12 at the service provider 10 as will be detailed later. FIG. 5(a) shows an example in which the unique information is sorted and managed by the kinds of the machines 2. The unique information from 00000001 to 00999999 is assigned to those machines 2 belonging to the "CR-2000" family, and the unique information from 01000000 to 01999999 is assigned to those machines 2 belonging to the "CR-2001" family. In FIG. 5(b), the unique information is assigned in a seemingly random manner, not based on the kinds of the machines 2. This latter case represents the most natural method to, for example, assign the unique information according to the sequence by which the contract signers 1 sign the contract in the provision of the service by the present invention.

By the former method, the unique information is sorted by the kinds of the machines 2, offering a useful display by which the user can have a quick look at the number of contracts and other information from one machine 2 to be serviced to the other. However, the first figure to be assigned to each machine 2 needs to be determined in accordance with the number of families of the machines 2 in advance. Typically the figure is determined so that the same number of families are assigned to each machine 2; in actual practice, the number of contracts may vary depending on the kind of the machine 2, and in some cases the assigned figures may be insufficient or in contrast the prepared figures may not be used at all.

Meanwhile, by the latter method, unique information is assigned to each machine 2 based on an actual contract. The assigned figures are never too many or too few and utilized efficiently. Especially, the number of digits representing the unique information would be sufficient if it is equal to the number of digits actually required. This prevents the development of a problem that increasing numbers of digits add to the time for it to take the unique information data to be read and reduce the storage space of the storage unit 4 in the machine 2. The same line of description applies to the storage unit 124 in the terminal 12.

As described in the foregoing, other methods are also possible as long as different unique numbers., symbols, etc. are assigned to any different machines 2 to be serviced, including those belonging to different families.

In the unique information managing table in FIGS. 5(a), 5(b), the contract signer ID (will be detailed later) used to identify the contract signer 1 to which the machine 2 is delivered is recorded in association with the unique information on the delivered machine 2.

Next, referring to FIG. 1, the configuration of the terminal 12 (machine managing device) of the service provider 10 will be explained.

The terminal 12 is, for example, a personal computer (PC) or workstation (WS) including a communications unit 121, a processing unit 122, an input unit 123, a storage unit 124, and an output unit 125.

The communications unit 121 is provided to connect to the network 20 and is, for example, a modem if the network 20 is telephone lines 20A. The communications unit 121 may have a function to connect to a local network 22.

The processing unit 122 processes the information fed from the communications unit 121 or the input unit 123 and is, for example, a CPU or memory. The memory would be, for example, a RAM to temporarily store results of the processing. If the processing is done by software, a non-volatile memory is prepared to store a program specifying procedures of the processing. Alternatively, the program may be stored in the storage unit 124 (will be detailed later) and read from the storage unit 124 to load and run the program in the RAM.

The input unit 123 is, for example, a keyboard, mouth, pointing device, image scanner, barcode scanner, and is used to input, for example, the information about the contract signer 1.

The storage unit 124 (the first and second storage units) offers store space where the information fed from the communications unit 121 or the input unit 123 and results of the processing done by the processing unit 122 are recorded, and is, for example, a hard disk or optical disk. Stored contents include an aforementioned unique information managing table of a machine 2, a contract signer information table (will be detailed later), a machine managing table for each contract signer 1, a machine managing program specifying a process flow of the service managing method in accordance with the present invention, and an application program. The storage unit 124 is equivalent to a storage medium in the present invention.

The output unit 125 is to produce a "soft copy" or hard copy of the information. Examples of the former include CRTs and liquid crystal displays, and examples of the latter include printers.

(Process of Registering Unique Information)

The following description will describe how the system works.

First of all, the service provider 10 causes the storage unit 4 in the machine 2 covered by the contract to record the unique information on the machine 2

Further, as shown in FIGS. 5(a), 5(b), the unique information managing table is created and stored in the storage unit 124 in the terminal 12. The unique information managing table is updated when new unique information is produced. New unique information is produced when the machine 2 covered by the contract is given unique information.

(Process of Registering Contract Signer Information)

Next, the service provider 10 obtains the information on the contract signer 1 as advance information. As shown in the contract signer table [1] in FIG. 4(a), the information may be anything by which the contract signer 1 can be identified, for example, the name of a company if the company is the contract signer 1. If different divisions of the same company are covered by different contracts, since the names of the divisions need be recognized, the names of departments, as well as the name of the company, are registered. The contract signer 1 may be a private individual.

Next, for the terminal 12 to handle the contract signer information, the service provider 10 issues a contract signer ID (or may be referred to as a contract signer ID number when the contract signer ID is given in the form of a numeral) to each contract signer 1. The contract signer ID is unique; a single ID, for example, a numeral like 000125, is given to every contract signer 1.

The name of the contract signer and other contract signer information may be fed from the machine 2. Therefore, the registration of the contract signer ID is not essential, but still come in handy in the electronic management of the information on the contract signer 1.

Further, the location, payment of method, and other information is collected to deliver and collect the machine 2 to be serviced and collect fees.

The foregoing is recorded in the storage unit 124 in the terminal 12 in the form of electronic files. FIG. 4(a) above is an example of a file displayed on the output unit 125 of the terminal 12.

(Process of Confirming Serviced Machine)

Next, the service provider 10 sends service personnel to the contract signer 1 to deliver the machine 2. The machine 2 is then connected and set up so that it can establish connection to an external network 20. When the machine 2 is ready for communications, the machine 2 sends its unique information (ID number) to the terminal 12 via the network 20. Here, if the given contract signer ID is paired with unique information for transmission, the terminal 12 can more surely detect the correspondence between the machine 2 and the contract signer 1.

A copying machine, which has numeric keys to specify the number of prints, would allow easy input of the ID number(s) of the contract signer ID and/or the machine 2 to the machine 2 using the numeric keys (input means). The contract signer ID, once input, never needs to be input again when the contract signer 1 transmits information to the service provider 10, provided that the ID is recorded in a nonvolatile memory. Likewise, the unique information (ID number) of the machine 2, once stored in a nonvolatile memory upon shipment, does not have to input again and allows for automatic, electronic handling of a series of operations.

As described in the foregoing, in the terminal 12, necessary contents are entered to the contract signer table [2] as shown in FIG. 4(b). For example, the contract signer 1 with a contract signer ID number, 000003, is receiving service for the two machines 2 identified by unique information, 00000004 and 01000001 respectively, in accordance with the present invention.

The contract signer tables [1], [2] can be merged in a single table as common information to relate contract signer ID numbers. Therefore, referring to FIG. 4(a) would tell that the contract signer with an ID number, 000003, is AAA Div. of XYZ Co. Limited.

Further, referring to the unique information managing table in FIG. 5(a), the machines 2 with unique information, "00000004" and "01000001," are CR-2000 and CR-2001 color ink jet printers respectively.

The contract signer table [3] in FIG. 4(c) may be created by the processing unit 122 replacing the unique information on the machine 2 entered to the contract signer table [2] with a type indicating a specific family, in reference to the unique information managing table in FIG. 5(a) or 5(b). In the contract signer table [3], when a contract signer 1 owns more than one machine 2 belonging to the same family, like the contract signer 1 with a contract signer ID number, 000002, the number of machines owned are written and added in parentheses, like "(1)", "(2)".

By displaying the hence created contract signer tables [1]–[3] together on the screen of the output unit 125, the service provider 10 can quickly get detailed information about the contract signer 1 and the family/families and number(s) of machines owned and serviced.

By this step, the terminal 12 can automatically detect the family of the machine 2 owned by the contract signer 1 and obtain family information as a serviced object.

The terminal 12 of the service provider 10 creates a machine managing file for each contract signer 1 which is recorded in the storage unit 124. FIGS. 6(a), 6(b) show an example of the file as it is being displayed by the output unit 125 of the terminal 12.

Here, although an in-use machine table (FIG. 6(a)) and a machine managing table (FIG. 6(b)) are prepared, only the machine managing table will do. Initially, the machine information which is being used in the machine 2 of the contract signer 1 is not included as shown in FIGS. 6(a), 6(b). As a result of the foregoing step, the name of the machine 2 is entered in a cell under "Machine Information <1>," the type of the machine 2 under "Machine Information <2>," and the unique information on the machine 2 under "Unique Information," as shown in FIGS. 7(a), 7(b).

Now, the machine table and machine managing table will be explained in reference to FIGS. 7(a), 7(b). Registered information include: machine information <1> and <2>, such as "Color Ink Jet Printer" and "CR-2000" respectively; unique information by which the machine 2 is identified; the date on which the machine 2 having that unique information is delivered to the contract signer 1 identified by the contract signer ID, 000001 (here, the same date as the date of registration); the date on which the unique information is received from the machine 2 having unique information, 00000001, via the network 20 (here, the same date as the date of network connection confirmation); the date on which the machine 2 with the unique information is a near-empty state of ink and the condition is detected via the network 20 (the date of detecting near-emptiness); and the date on which a new machine 2 is dispatched based on the detection of near-emptiness (the date of dispatching a replacement); and the date on which the near-empty machine 2 is collected (the date of collection).

Incidentally, in the description of FIGS. 7(a), 7(b), as to model-by-model information on the machines 2 and the like, actual names, such as "Color Ink Jet Printer" and "CR-2000," are supplementally used as machine information <1> and <2>, as well as numerically represented unique information, in view of the user interface.

The registered date information is usable as information representing the date and time when the service provider 10 has delivered a machine 2 or a replacement of one to the contract signer 1 when or after the service starts.

In a case where the delivered machine 2 is used and the terminal 12 detects the connection to the terminal 12 via the network 20, the date of network connection confirmation can be used to represent that date. As in the present embodiment, in a case where the service personnel connects the machine 2 to the network 20 upon delivery to transmit the unique information on the machine 2 recorded in the storage unit 4 in the machine 2 to the terminal 12, the machine 2 can be regarded as being connected to the network when the information is received. The date of reception is entered in a cell under "Date of Network Connection Confirmation," as shown in FIG. 7(b). In this case, the date of network connection confirmation is the same as the date of registration.

Since the terminal 12 becomes capable of receiving unique information in such a manner by use of the machine 2 (concretely, unpacking of the product, for example), the use of the machine 2 can be confirmed through the detection of the reception of the unique information, and the reception can be used as a criterion to determine whether to include the machine 2 in a charging process.

Next, the date of detecting near-emptiness is the date on which, as will be detailed later, the machine 2 connected to the network 20 is detected via the network 20 to be in a near-empty state of ink and becoming near-empty. A process is started in accordance with the present invention upon the detection of the information.

The date of dispatching a replacement is information on the date, following the near-emptiness information reception, on which the service manager 10 dispatches a new machine 2 of the same kind as the machine 2 for which an order is placed or the date on which the processing unit 122 in the terminal 12 makes an instruction for a dispatch. An instruction may be made for the manufacture or fabrication of the machine 2 instead of for a dispatch. In such cases, the machine 2 is manufactured or fabricated according to the manufacture or fabrication instruction, and there is no need to build an inventory of machines 2, thereby cutting related costs.

The instruction may be sent to an in-house manufacturing, logistics, or transport division equipped with a communications terminal connected to the terminal 12 via the local network 22 or an affiliate or external contractor equipped with a communications terminal connected to the terminal 12 via the network 20. This allows for division, cooperation, and outsourcing of labor to name a few, and greater freedom in the service as a whole.

Further, the date of collection is the date on which the near-emptiness information is transmitted and the machine 2 incapable of running continuously due to the consumption of ink (consumable article) is collected. Accordingly, the machine 2 no longer needed by the contract signer 1 can be collected; the contract signer 1 does not have to bother to dispose the machine 2, replace the ink cartridge, or refill the ink cartridge as well as to do maintenance work on the machine 2 related to the replacement and refilling of the consumable article.

The service provider 10 can surely collect the machine 2 and therefore effectively run the recycle system. Third parties' "pirating activities" can be discouraged in which disposed machines 2 are sold after only being refilled with ink or other consumable articles.

Further, if a machine 2 is reused as a result of pirating activities, delivered to a contract signer 1, and connected to the network 20 for transmission of its unique information to the terminal 12, a likely second-time reception of the unique information, which is illegal, can be detected based on the machine and machine managing tables shown in FIGS. 7(a), 7(b) in which the date of network connection confirmation is specified, but the date of dispatching a replacement and the date of collection are yet to be specified.

When the configuration is such that the contract signer ID and the unique information on the machine 2 are paired up for transmission, the deliver of a pirated machine 2 to a different contract signer 1 would result in discrepancy between the pair of the contract signer ID and the unique information on the machine 2 detected by the processing unit 122 and the pair registered in the unique information managing table in the terminal 12. Based on the detection of the discrepancy, illegal reception of the unique information is detectable. Pirating activities are discouraged accordingly.

A pair of a contract signer ID and unique information on a machine 2 to the terminal 12 may manually be entered to the terminal 12 of the service provider 10 using, for example, a keyboard before the service provider 10 dispatches the machine 2 to the contract signer 1. Alternatively, since the contract signer ID can be specified from associated unique information received from the machine 2 by the processing unit 122 referring to the contract signer tables in FIGS. 4(a)–4(c) or the unique information managing tables in FIGS. 5(a), 5(b), the contract signer ID is not necessarily entered to the machine 2 and the unique information may be entered alone.

By the above operations, the information (family, number, unique information) on the machines 2 delivered to the contract signer 1 is accumulated in the terminal 12 of the service provider 10. That is, the machine managing table for each contract signer 1 shown in FIG. 7(b) is updated.

Figure 13:
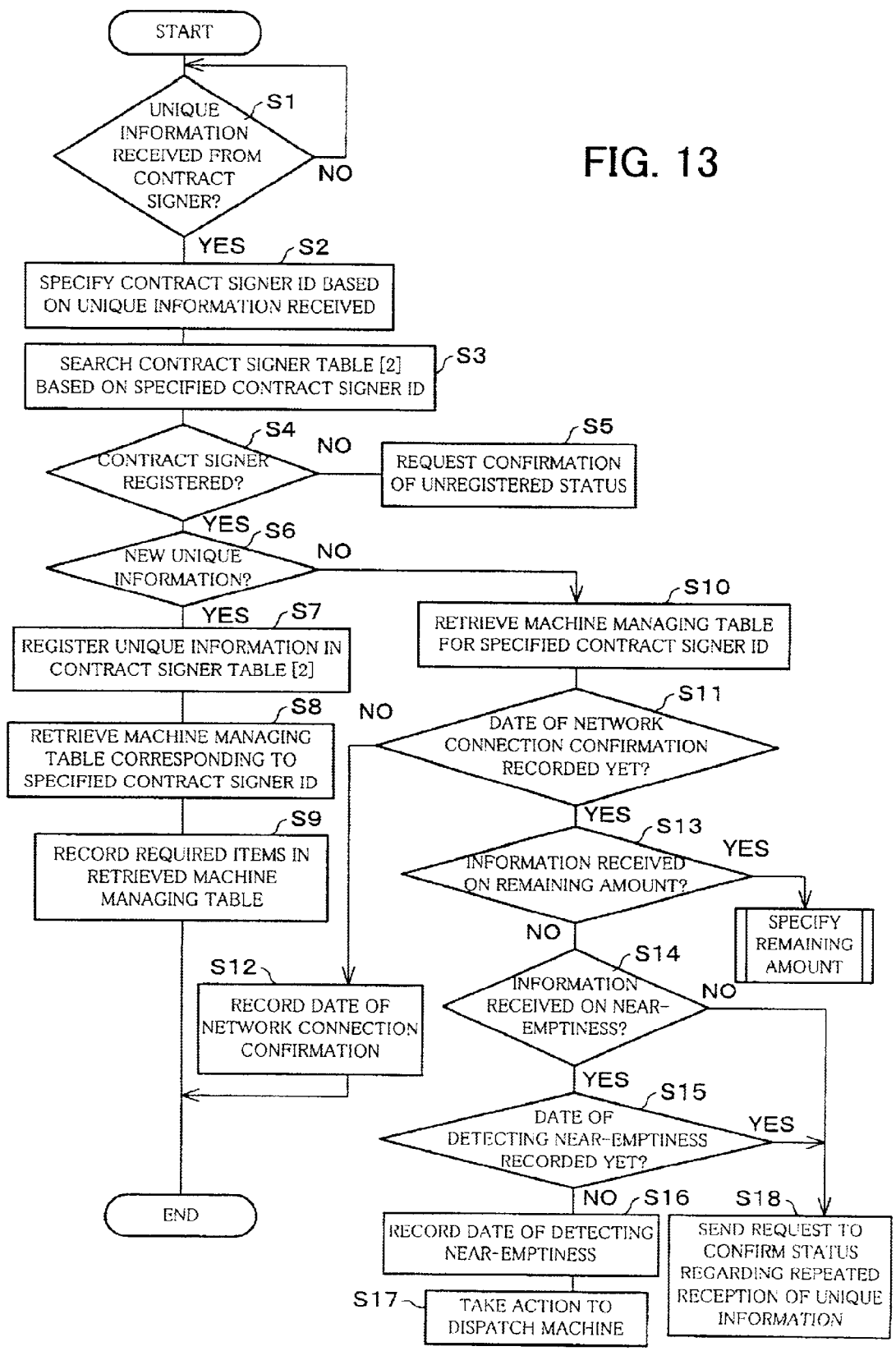
FIG. 13 is a flow chart showing a flow of control activities carried out by a processing unit in relation to a process to automatically updating a machine managing table.

The flow of control activities by the processing unit 122 in relation to the aforementioned automatic updating of the contract signer table [2] and the machine managing table will be described further in reference to the flow chart in FIG. 13.

Step [1] (S1)

First, it is determined whether information including at least the unique information on the machine 2 (further including the contract signer ID and the authentication password of the contract signer 1 depending the embodiment) has been received from the machine 2 of the contract signer 1 via the communications unit 121. When the information is received, the operation proceeds to S2; when not, the reception is awaited.

Step [2] (S2)

Next, based on the unique information on the machine 2 received in S1, one of the unique information managing tables shown in FIGS. 5(a), 5(b) is searched to specify a contract signer ID that matches the unique information received.

This step can be omitted if the machine 2 pairs up the unique information and the contract signer ID for transmission.

Step [3] (S3)

Subsequently, based on the detected contract signer ID, the contract signer table [2] (FIG. 4(b)) recorded in the storage unit 124 is accessed, and the contract signer table [2] is searched to confirm whether the detected contract signer ID is registered. In the contract signer table [2], at least the contract signer ID is recorded when the machine 2 is delivered to the contract signer 1.

Step [4] (S4)

In S4, it is determined from results of the search through the contract signer table [2] whether the contract signer ID is registered.

Step [5] (S5)

If it is not confirmed in S4 that the contract signer ID is registered, a request to confirm the unregistered status of the contract signer ID is made in S5. Concretely, a message is displayed on the screen of the output unit 125, telling that the contract signer ID is not registered or an email message is transmitted to an internal managing division equipped with a communications terminal connected to the terminal 12 via the local network 22 to notify that the contract signer ID is not registered.

Step [6] (S6)

If it is confirmed in S4 that the contract signer ID is registered, it is determined whether the received unique information is new and yet to be recorded. The determination is sufficiently done by checking all the unique information recorded in the contract signer table [2] against the received unique information.

Step [7] (S7)

If the unique information is confirmed as being new in S6, the unique information is recorded as a new contract family in association with the corresponding contract signer ID in the contract signer table [2]. Thus, a new machine 2 is registered in association with a contract signer ID.

Step [8] (S8)

Subsequently, among those machine managing tables each of which is created for a different contract signer 1 and stored in the storage unit 124, the machine managing table (FIG. 6(b)) bearing the contract signer ID specified in S2 is retrieved. The screen of the output unit 125 displays the retrieved machine managing table when necessary.

Step [9] (S9)

Next, required items are recorded in the machine managing table retrieved in S8. The required items is, as shown in FIG. 7(b), unique information (for example, "00000001", family information <1>, <2> retrieved from the unique information managing table shown in FIG. 5(a) or 5(b) based on the unique information (for example, "Color Ink Jet Printer and "CR-2000"), and the date of network connection confirmation (for example, "22/3/2000").

Step [10] (S10)

If S6 turns out that the same unique information is already registered, the machine managing table (FIG. 6(b)) bearing the contract signer ID specified in S2 is retrieved as in S8, so as to single out a reason from various, potentially possible ones: the machine 2 of which the unique information is registered may be connected for the first time to the network 20 for transmission and reception of the unique information when it is delivered to the contract signer 1, near-emptiness information may be received notifying that the machine 2 is in a near-empty state of ink and near empty, and the machine 2 may be being reused as a result of aforementioned pirating activities.

Step [11] (S11)

Subsequently, the unique information cells in the retrieved machine managing table is searched for the received unique information, and it is determined whether the date of network connection confirmation is recorded in association with the unique information.

Step [12] (S12)

If the date of network connection confirmation is not recorded in association with the unique information in S11, it means that the machine 2 is connected to the network 20 for the first time for transmission and reception of the unique information after the machine 2 is delivered to the contract signer 1, and the present date is recorded as the date of network connection confirmation.

Step [13] (S13)

Meanwhile, if it is confirmed in S11 that a date of network connection confirmation is already recorded in association to the unique information, it is subsequently confirmed whether the information received in S1 contains information on the remaining amount of the ink currently in use in the machine 2.

If it is confirmed in S13 that the information received in S1 contains information on the remaining amount, the operation proceeds to determine the remaining amount, which will be detailed later in reference to FIG. 14.

Step [14] (S14)

Meanwhile, if it is confirmed in S13 that no information on the remaining amount is contained, it is subsequently confirmed whether the information received in S1 contains near-emptiness information.

Step [15] (S15)

If it is confirmed in S14 that near-emptiness information is received, it is subsequently checked whether a date of detecting near-emptiness is recorded in association with the unique information.

Step [16] (S16)

If it is confirmed in S15 that no date of detecting near-emptiness is recorded, it means that near-emptiness information has been received normally, and a date of detecting near-emptiness is recorded in association with the unique information.

Step [17] (S17)

Based on the confirmation of the normal reception of near-emptiness information in S16, an action is taken to dispatch a new machine 2 to the contract signer 1. The dispatch action will be detailed later.

Step [18] (S18)

Meanwhile, if it is confirmed in S14 that no near-emptiness information is received, it means that unique information for which a date of network connection confirmation was recorded is received again, which is a likely indication of the machine 2 being reused as a result of aforementioned pirating activities. Therefore, a request to confirm the status is made regarding the repeated reception of the unique information as in S5.

If it is confirmed in S15 that a date of detecting near-emptiness is already recorded, it again means that unique information for which a date of detecting near-emptiness was recorded and near-emptiness information are received again, which is a likely indication of the machine 2 being reused or involved in an undesirable situation as a result of aforementioned pirating activities. Therefore, a request to confirm the status is made regarding the repeated reception of the unique information as in S5.

Executing either S9 or S12 in the above manner completes the automatic updating of the contract signer table [2] and the machine managing table.

FIGS. 4(b), 7(b), 8(b) show examples of results of the automatic updating of the contract signer table [2] and machine managing table.

Incidentally, it suffices if the machine tables (FIGS. 7(a)–11(a))) which records information on the machine 2 currently in use by the contract signer 1 are updated when the machine managing table is updated, by transcribing the updated information.

Moreover, provided that the unique information managing table shown in FIGS. 5(a), 5(b) has cells for information on the contract signer 1 (contract signer ID cells) and that the unique information and the contract signer ID are paired up for entering to the machine 2, unique information on the contract signer 1 (contract signer ID) can be entered in the contract signer ID cell when the unique information and the contract signer ID are received from the machine 2.

The unique information on the machine 2 is obtained via the network 20, which is a sure evidence that the contract signer 1 is the owner of the machine 2 and gives grounds for the service provider 10 to start the service (confirmation of a service starting timing and contract issuance).

In the description so far, it was supposed that the unique information on the machine 2 is sent automatically to the terminal 12 of the service provider 10; however, the service provider 10 may register the information in the terminal 12 using the input unit 123.

(Process of Determining Remaining Amount)

Now, referring to FIGS. 14, 15(a), 15(b), the aforementioned remaining amount determination will be described. FIG. 14 is a flow chart showing a flow of control activities to determine a remaining amount. FIGS. 15(a), 15(b) are examples of managing tables displayed on an information managing screen.

In these examples, the remaining amount information transmitted by the machine 2 is the number of ink droplets produced in this printing operation. If the machine 2 has discharge capability to discharge ink droplets that can be varied in size, numbers of ink droplets may be transmitted according to sizes of ink droplets or converted into a corresponding number of smallest ink droplets for transmission.

Concretely, if, for example, there are two kinds of ink droplets, large and small, the information is transmitted to the terminal 12 only after processed so that (Number of Discharged Large Ink Droplets), (Number of Discharged Small Ink Droplets) or (Number of Discharged Large Ink Droplets as Counted in Terms of Small Ink Droplets)+ (Number of Discharged Small Ink Droplets). The information processing can be done using the controller unit 3 or other dedicated graphic processing unit (not shown) for image processing. The latter case will be described below, for convenience in description.

Step [20] (S20)

The number, Dp, of discharged ink droplets managed by the foregoing rules is obtained from the machine 2.

Step [21] (S21)

The cumulative number, Da, of droplets representing the cumulative number of discharged droplets is retrieved from the machine managing table shown in FIGS. 15(a), 15(b). A machine managing table is already retrieved in S10.

Step [22] (S22)

Add the cumulative number, Da, of droplets to the obtained number, Dp, of the discharged droplets.

In other words, calculate according to D=Dp+Da.

Step [23] (S23)

A specified value Dc is retrieved from the machine managing table for comparison with the calculated sum, in other words, to see if $D \geq Dc$.

Step [24] (S24)

If $D \geq Dc$ holds in S23, it can be interpreted as the remaining amount of the consumable article in the machine 2 having reached a specified remaining amount or dropped below the specified remaining amount to "near-emptiness" as a result of these printing activities; therefore, the operation proceeds to S16 in FIG. 13 where a date of detecting near-emptiness is recorded.

Step [25] (S25)

If D<Dc holds in S23, it means that the sum D of the number, Dp, of discharged droplets and the cumulative number, Da, of droplets has not reached the specified value Dc yet and the remaining amount of the consumable article in the machine 2 can be determined to be larger than or equal to the specified remaining amount. Accordingly, the machine managing table is updated by entering the sum D in a "cumulative value Da" cell corresponding to the cumulative number of droplets Da in the machine managing table. That is, the cumulative number, Da, of droplets is updated by substituting D for Da.

In the description so far, a method of managing the number of consumed ink droplets was described. Alternatively, the remaining amount of ink may be managed based on the remaining obtained by subtracting consumed amounts from the full capacity.

In the description so far, a case where a single color was involved was described. In the case of a color printer, the consumption is calculated by the described flow for each color, to determine the remaining amount for that color.

(Process of Transmitting Remaining Amount)

Next, the operations of the machine 2 when ink has reached a specified value with a small amount remaining will be described.

Settings are made so that the machine 2 will operate as follows. When the ink cartridge has reached near-emptiness, the remaining-amount-detecting unit 7, such as an ink remaining amount sensor, produces a signal: if the cartridge is full, the unit 7 produces a voltage corresponding to a logic "Low," and if the cartridge is near-empty, the unit 7 produces a voltage corresponding to a "High." When the controller unit 3 detects a variation in the voltage value, the machine 2 instructs the transmitting and receiving unit 5 to establish connection to the terminal 12.

If the machine 2 has connected to the terminal 12 via a network at that time, the unique information on the machine 2 is retrieved from the storage unit 4 and if necessary, a contract signer ID is added to the unique information for transmission from the transmitting and receiving unit 5. All these activities are done automatically.

Meanwhile, if the machine 2 is yet to connect to the terminal 12, a display unit, for example, liquid crystal display, LED, or organic EL, of the machine 2 displays a message, or light is turned on or caused to flicker, so as to alert the user of the machine 2. The message would read like this: "Ink cartridge is almost empty. Connect to the Network to inform XYZ." Alternatively, a PC (personal computer, not shown) connected to the machine 2 via the local network 21 is informed by email or other means. Note that "XYZ" indicates a specific service provider.

A machine manager or user of the contract signer 1 having a contract with the service provider 10 connects the machine 2 to the terminal 12 via a network when there is an "Ink cartridge is almost empty" message coming from the machine 2. The controller unit 3 in the machine 2 transmits the unique information on the machine 2 and if necessary, the contract signer ID to the terminal 12 as described earlier.

The following is an example of an "Ink cartridge is almost empty" message.

000001|00000001|01|1

Here, "|" indicates a separation of information. They are used to separates three parts.

"000001" at the beginning is information indicating a contract signer ID, following "00000001" indicates the unique information on the machine 2, the third part, "01," are bits associated with the kind of message, and "1" at the end is a bit associated with the remaining amount of ink in the machine 2 (remaining amount information).

The kind of message indicates contents exchanged between the machine 2 and the terminal 12, and the processing unit 122 can determine which process to execute, for example, whether to load a processing program corresponding to the message, according to the detected bits. Other messages include those related to fee charging and updating procedures executed via a network on the information registered in the contract signer table [1].

However, when the contents exchanged between the machine 2 and the terminal 12 are limited to the "Ink cartridge is almost empty" message or no other message is ever possible, the kind of message information may be omitted.

The bit related to the remaining amount of ink in the machine 2 is the major feature of the message at issue and offers a method preferably used to regularly transmit information related to the remaining amount of ink to the terminal 12 irrespective of whether the ink cartridge is near-empty. For example, a 0 indicates that the remaining amount of ink is more than or equal to a specified value and a 1 indicates that the remaining amount is less than a specified value (near-empty). In this example, the terminal 12 can receive information ("0") anyway even when the remaining amount of ink is more than or equal to a specified value, that is, the remaining amount of ink has not dropped to a near-empty level yet.

Thus, the terminal 12 can more frequently detect information on the remaining amount of a consumable article in the machine 2. Therefore, even if network trouble or other factors cause an "Ink cartridge is almost empty" message to be incompletely transmitted to the terminal 12, the terminal 12 will have another opportunity to detect the "Ink cartridge is almost empty" message later when the machine 2 transmits information. If the terminal 12 monitors the bit, the terminal 12 can detect a change from 0 to 1, which can be interpreted to indicate that the ink cartridge has become near empty.

Further, if the machine 2 transmits the "Ink cartridge is almost empty" message to the terminal 12 only when the machine 2 detects near-emptiness, the bit indicating the remaining amount information may be omitted, because the terminal 12 is capable of detecting by the reception of a message from the machine 2 that the machine 2 has now become near-empty.

If the information indicative of a contract signer ID and the unique information on the machine 2 are associated and managed in the storage unit 124 in the terminal 12, only either information would be sufficient, because the other item can be specified by referring to the unique information managing table. For example, by acquiring a contract signer ID, the machine 2 owned by the contract signer (service receiver) 1 having that contract signer ID can be identified.

However, as shown in FIG. 4(b), there are cases where a single contract signer ID corresponds to unique information on multiple machines 2, in which cases the unique information on the machines 2 is transmitted. This ensures that the machines 2 are identified.

Needless to say, combining and encrypting these three parts for security purposes still falls within the scope of the present invention as long as the combination can be decrypted to restore the original three parts.

Hence, the unique information on the machine 2 is transmitted from the machine 2 to the terminal 12 of the service provider 10.

In the terminal 12 of the service provider 10, as shown in FIGS. 8(a), 8(b), "the date of detecting near-emptiness" cell is updated.

Figure 14:
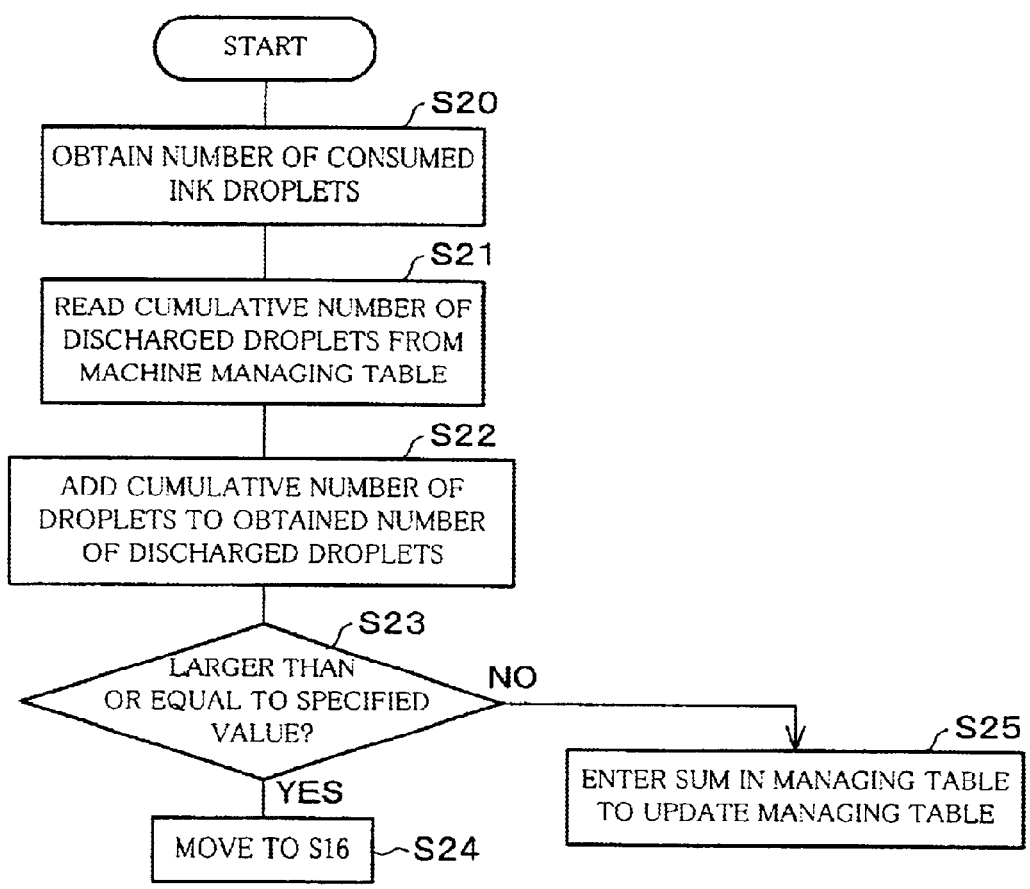
FIG. 14 is a flow chart showing a flow of control activities carried out by a processing unit in relation to a process to determining a remaining amount in accordance with the present invention.

Incidentally, the process of determining the remaining amount described in FIG. 14 can be replaced with the reception of an "Ink cartridge is almost empty" message from the machine 2, since in this event the machine 2 has already detected near-emptiness and there is no need for the terminal 12 to repeat the determination process.

As in the foregoing, the service provider 10 continuously monitors the information on the remaining amount of ink in the machine 2 and dispatches a new machine 2 to the contract signer 1 when it detects near-emptiness. Thus, the machine 2 can be prevented from becoming inoperable due to the exhaustion of the consumable article at the contract signer 1.

Incidentally, in the description so far, the machine 2 is provided with a sensor (remaining-amount-detecting unit 7) which detects the remaining amount of ink or software which calculates the amount, and the machine 2 detect the remaining amount of ink, determines whether the cartridge is near-empty, and informing when near-emptiness occurs. This is not the only possibility: all or some of the functions described in the foregoing may be moved to the terminal 12.

For example, if the machine 2 is always connected to the terminal 12, data related to the amount of ink to be consumed based on print data (after change in the data sequence and other operations, since raw data is a possible cause for confidentiality problems to occur) can be continuously transmitted to the terminal 12 to execute a print job so that the terminal 12 manages and calculates ink consumption of each machine 2 to add up the calculated values to manage. This allows for omission of all the hardware and software to detect the remaining amount of ink from the machine 2.

(Process of Instruction)

At this stage, the service provider 10 dispatches a new machine 2 to the contract signer 1. FIG. 9(b) shows a machine managing table reflecting the dispatch. A new machine information (unique information: 00000040) is added as "No. 2" for the contract signer 1 with a contract signer ID, 000001. However, the machine table in FIG. 9(a) is not updated at this stage, since the new machine 2 with unique information, 00000040, is yet to be registered or connected to a network.

The instruction to dispatch a new machine 2 may be displayed on the output unit 125 by the processing unit 122 of the terminal 12 or sent via the local network 22 connected to the communications unit 121 an in-house dispatch division of the service provider 10 or an external transportation firm to which the job is outsourced, by means of email or other like means. A further alternative is to send an advance notice of a dispatch to the contract signer 1 via the network 20 connected to the communications unit 121.

Incidentally, the instruction dose not necessarily made requesting a dispatch, but also for the manufacture or fabrication of a new machine 2. Although depending on reduction of the lead-time from ordering to manufacture, these are instruction methods made possible by novel production restructuring, management, etc. for the sake of recent trends for a smaller or zero inventory.

Next, in response to the dispatch instruction, a new machine 2 is dispatched. FIGS. 10(a), 10(b) show an example of a display when a machine 2 (with unique information, 00000040) has been dispatched to the contract signer 1 with a contract signer ID, 000001. In this case, a date of registration is newly entered for the machine 2 whose unique information is 00000040, which shows that service personnel has confirms the delivery. In this situation, a date of collection is entered for the machine 2 whose unique information is 00000001, which shows that a used machine 2 has been collected (at the same time as the replacement with a new machine 2 in this example).

Incidentally, as shown in FIG. 10(a), in a machine table currently in use, the unique information cell for the machine 2 is updated from 00000001 to 00000040. However, the machine table may be updated as below based on the detection by the processing unit 122 of connection of the machine 2 to the network 20.

(Process of Confirming Machine Dispatches)

Now, a process will be described which confirms via the network 20 that a new machine 2 is operating after delivered to the contract signer 1 by the foregoing process.

The new machine 2 is installed and set up by service personnel upon delivery, to transmit the unique information the machine 2 to the terminal 12 as described in "Process of Confirming Serviced Machines" above.

FIGS. 11(a), 11(b) show an example of a display when the terminal 12 has detected the reception of the unique information. Through this step, the actual use of the newly dispatched machine 2 can be detected over the network 20.

(Variation of Registration)

The following will describe an embodiment related to the registration of unique information in reference to FIGS. 16(a), 16(b), 17(a), 17(b).

The description starts where a "No. 2" new machine (with unique information, 00000040) has been dispatched to the contract signer 1 with a contract signer ID, 000001, as shown in FIGS. 9(*a*), 9(*b*). In the foregoing example, "the date of registration" is entered into an information cell and the registration is thus confirmed when the new machine 2 is delivered to the contract signer 1 as shown in FIGS. 10(*a*), 10(*b*). Once the registration is confirmed, the contract signer 1 can be charged for the machine. In other words, as will be detailed later, basically, it would be reasonable that the contract signer 1 is charged on the date of network connection confirmation; however, the contract signer 1 may be charged when the delivery work is completed, considering the collection and other activities of the costs for the delivery work as viewed by the service provider 10.

Here, the completion of delivery work refers not only to the delivery work itself of the new machine 2 to the contract signer 1 carried out by service personnel, but also to the confirmation of collection of the machine 2 by the contract signer 1 (agreement of continuous provision of the service in the case of a series of services). In some cases like this, delivery work may not be completed upon delivery, for example, when the contract signer 1 decides to cancel the contract.

To handle these situations, in addition to the aforementioned date of registration, provisional/formal registration information cell provided in order to determine whether the registration is either provisional or formal is set to "Provisional Registration" when the new machine 2 is dispatched, as shown in FIGS. 16(*a*), 16(*b*), and the information cell is changed to "Formal Registration" when the delivery work is completed. When the information cell displays "Provisional Registration," the contract signer 1 can freely cancel the servicing of the machine 2 (with no charge). Meanwhile, after "Formal Registration," expenses for the delivery work can be collected from the contract signer 1.

Incidentally, the provisional registration may be changed to a formal registration some time other than when the deliver is completed: the registration may be done, after a certain period of time, for example, a week after the completion of deliver. Thus, the contract signer 1 could enjoy a better service where he/she would be offered time to consider continuation, suspension, cancellation, etc. of the service contract.

FIGS. 17(*a*), 17(*b*) show an example of an information managing screen when the contract signer 1 has canceled the contract to continuously receive the servicing for the No. 2, new machine (unique information: 00000040). The provisional/formal registration information cell has changed from "Provisional Registration" to "Cancelled." Leaving intact delivery history regarding the No. 2, new machine in this manner makes it possible to obtain information on, for example, transport routes when the machine 2 is delivered to another contract signer 1 and problems ensue in terms of performance by any chance, and therefore effective when compared with a case where all information is deleted from the managing table once the contract is cancelled.

As described in the foregoing, "Provisional Registration" is temporary and fixed to either "Formal Registration" or "Cancelled" after a period of time.

Incidentally, needless to say, the provisional/formal registration information cell may be provided in the contract signer table [2] in FIG. 4(*b*) and the unique information managing table in FIGS. 5(*a*), 5(*b*) too.

If the information cell is fixed to "Cancelled," the processing unit 122 can search the unique information managing table in FIGS. 5(*a*) and 5(*b*) for contract signer information (contract signer ID) to which the machine 2 is applicable and find a contract signer 1 who has a contract regarding the same family as the machine 2. This enables effective use of the "cancelled" machine 2 for another contract signer 1.

(Process of Charging)

Next, a charging processing method will be described. FIG. 12 shows machine lists (account list [1]–[3]) covered by the charging process. Charges are calculated once every months, for example. The account lists are created by, for example, extracting information on machines used during a one-month-period before the closing date for charge calculation (every 15th day of the month in this embodiment) based on the machine managing tables shown in FIGS. 9(*b*), 10(*b*). The extraction method is applied to the information for which the date of network connection confirmation falling in the one-month-period before the closing date for charge calculation is entered in the machine managing table.

FIG. 12 shows account lists for the past three months.

As described in the foregoing, in the present invention, the terminal 12 of the service provider 10 monitors the remaining amount of the consumable article in the machine 2 owned by the contract signer 1 via the network 20, and when the remaining amount drops to or below a specified value, an instruction is made to dispatch a new machine 2 a to the contract signer 1. Therefore, as soon as a machine 2 filled with the consumable article is delivered by delivery personnel who receives the instruction, the contract signer 1 can continuously use the machine 2 without having the machine 2 inoperable due to the complete consumption of the consumable article.

The most principal feature lies in that when the consumable article is detected to be in a near-empty state, a new machine 2 is dispatched to replace the machine 2 containing the consumable article. Thus, conventionally necessary replacement of consumable goods, for example, an ink cartridge is no longer required, which reduces the workload of the machine user.

Further, once the machine 2 is connected to the terminal 12 via the network 20, the complete consumption of the consumable article in the machine 2 can be detected automatically; therefore, the user of the machine 2 is totally freed from the management (inventory management and ordering of consumable articles, replacement of consumable goods, etc.) of the machine 2 and can continuously use the machine 2 without doing any maintenance work.

Incidentally, the present invention may be a system in which a server is provided between the machine 2 and the terminal 12, in which case, the machine 2 sends information to a server provided in the form of a personal computer and the terminal 12 likewise receives that information from the server. The aforementioned detection of the near-empty state and other tasks executed by means of software may be assigned to the server instead of the machine 2 or the terminal 12.

Incidentally, the present invention is applicable not only to printers, but to any other system involving multiple machines (e.g., a host computer, interfaces, readers, printers, etc.) and also to a stand-alone device (e.g., copying machine and facsimile device).

The objective of the present invention is of course achieved by loading in a system or device a storage medium on which software program codes are recorded to carry out the functions earlier mentioned in the embodiments and loading the program codes from the storage medium for execution by a computer (or CPU, MPU, etc.) in the system or device.

When this is the case, program codes themselves, loaded from the storage medium, realize the functions earlier mentioned in the embodiments, and the storage medium on which the program codes are recorded constitutes the invention.

The storage medium which supplies the program codes may be, for example, a floppy disk, a hard disk, an optical disk, a magneto-optical disk, a magnetic tape, a nonvolatile memory card, or the like.

The program codes may be downloaded from another computer system to the storage unit 124 in the terminal 12 via a transmission medium like a communications network.

Further, the scope of the invention encompasses not only cases where the aforementioned functions of the embodiments are realized by a computer executing retrieved program codes, but also cases where the OS (operating system) or the like running on the computer based on instructions in the program codes execute all or part of actual processes which realize the functions of the aforementioned embodiments.

Cases are also encompassed in which after the program codes retrieved from the storage medium are loaded into an extension board installed in the computer or a memory provided in an extension unit connected to the computer, a CPU in the extension board or unit carries out in response to instructions in the program codes all or part of actual processes which realize the functions of the aforementioned embodiments.

To apply the present invention to a storage medium, the storage medium stores program codes corresponding to the aforementioned flow chart.

The present invention is not limited to the foregoing embodiments, but may be varied greatly within the scope set forth in the claims.

Incidentally, throughout the whole description, the major parts of the present invention are directed to servicing a machine which requires refilling or replacement of a consumable article (consumables) for continuous use. Therefore, the present invention is not limited to copying machines, printers, and the like and is applicable to any machine for which unique information is provided or recorded and which can transmit information on the remaining amount of a consumable article and unique information via a network.

The machine managing method of the present invention may include the step of when the unique information on the machine is obtained, accessing storage means on which the unique information on the machine is stored in association with information on the service receiver, so as to relate the unique information on the machine to the information on the service receiver.

According to this, since the unique information on the machine and the information on the service receiver are managed in association, only the unique information on the machine needs be obtained from the machine, which reduces amounts of information and communication times.

Incidentally, the storage means is not necessarily built in the computer of the service provider, as long as the computer of the service provider is accessible. For example, the storage means may be externally attached to the computer, provided as a portable, attachable and detachable device, or mounted to another computer connected to the computer via network.

The machine managing method of the present invention may include the steps of:

provisionally registering unique information to be assigned to the new machine on the storage means in relation to the information on the service receiver; and if the unique information on the machine is obtained from the service receiver, formally registering the unique information on the machine on the storage means in relation to the information on the service receiver.

According to this, the issuing of the unique information on the machine and the updating of the managing table are provisionally registered in a service whereby a replacement is dispatched for the machine when the machine sends information that the machine will likely not be able to continuously used, such as near-emptiness information, and the information is received; therefore, for example, if the service receiver notifies of cancellation of the contract upon delivery, a lead time is allowed for in delivery, charging, and other processes.

Further, obtaining the unique information on the machine delivered from the service receiver confirms that the machine is used by the service receiver. Therefore, the use of the machine can be confirmed when the information is obtained, and a formal registration can be done.

Incidentally, in view of sure detection of the use of the machine, the unique information on the machine is preferably obtained via a network connecting the machine to the computer of the service provider, and transmitted to the computer via the network when the service receiver has started using the machine.

In this case, receiving the unique information on the deliver machine via a network confirms that the service receiver has used the machine. The delivery of the machine can be confirmed when the information is received, and a formal registration can be done.

The machine managing method of the present invention may include the step of calculating a charge for the formally registered machine.

According to this, no charge occurs during provisional registration, allowing the service receiver to make a cancellation. Further, after formal registration, the service receiver can be regarded as having agreed to continuously use the managing service, including continuous use of the machine, and the service provider can carry out a charging process.

The processing unit in the machine managing device of the present invention may provisionally register unique information to be assigned to the machine to be delivered on the storage unit in relation to the service receiver, and when the unique information on the machine is obtained from the service receiver, formally register the unique information on the machine on the storage unit in relation to the service receiver and calculates a charge for the formally registered machine.

According to this, a provisional registration period during which the service receiver can cancel the contract for the service, etc. is provided before obtaining the unique information on the machine from the service receiver, allowing for consideration during that period. Meanwhile, the service provider can carry out a charging process after the registration period, and therefore can collect charges for sure.

The processing unit in the machine managing device of the present invention may calculate the charge for the machine if the unique information assigned to the machine is not obtained from the service receiver for a period after the dispatch of the machine to the service receiver.

According to this, the charging process is prevented from being suspended and ultimately discarded. The service provider can therefore prevent the charging process from being delayed carelessly and more surely collect the charges.

The present invention may be configured as below.

The machine managing method of the present invention may cover a machine connected to a network. For example, in a machine managing method of managing a machine for a service receiver via a network, a programmed computer caused to execute the steps of: obtaining, via a network, unique information on the machine by which the machine is identified and information on a remaining amount of a consumable article in the machine and subsequently determining whether or not the remaining amount of the consumable article has reached a specified value; and if the remaining amount has reached the specified value, making an instruction to dispatch a new machine to the service receiver who matches the unique information on the machine.

Further, the machine managing method of the present invention is a machine managing method of managing a machine connected to a network for a service receiver, and may include the steps of:

registering unique information on the machine in a terminal;

obtaining the unique information on the machine and information on a remaining amount of a consumable article in the machine via a network;

determining from the information whether or not the remaining amount of the consumable article has reached a specified value; and if the remaining amount has reached the specified value, making an instruction to dispatch a new machine.

According to this, since the remaining amount and the like of a consumable article in the machine are managed based on the unique information on the machine, an instruction to dispatch a new machine can be made based on the information. Further, if unregistered information is received, it can be determined that the machine is illegal, i.e., pirated, and the pirated goods can be eradicated by means of a warning or the like.

Further, the machine managing method of the present invention may include the steps of:

registering unique information on the machine in a terminal;

obtaining the unique information on the machine and information on a remaining amount of a consumable article in the machine via a network;

determining from the information whether or not the remaining amount of the consumable article has reached a specified value; and if the remaining amount has reached the specified value, making an instruction to manufacture or fabricate a new machine.

According to this, likewise, since the remaining amount and the like of a consumable article in the machine are managed based on the unique information on the machine, an instruction to manufacture or fabricate a new machine can be made based on the information. Not limited to the managing method for the aforementioned service receiver, the invention is further applicable to a case where an instruction is made for manufacture/fabrication in the manager.

Further, the machine managing method of the present invention is a managing method of managing a machine connected to a network for a service receiver, and may include the steps of:

registering unique information on the machine in a terminal;

obtaining, via the network, the unique information on the machine and detecting that a remaining amount of a consumable article in the machine has become a near-empty state; and making an instruction to dispatch a new machine.

According to this, it is detected when the remaining amount of a consumable article in the machine has become a near-emptiness, there is no need to further determine whether or not the remaining amount of the consumable article in the machine has reached a specified value or to do other processes. Therefore, an instruction to dispatch a new machine can be made only in response to reception of the information.

Further, the machine managing method of the present invention may include the steps of:

registering unique information on the machine in a terminal;

obtaining, via the network, the unique information on the machine and detecting that a remaining amount of a consumable article in the machine has become a near-empty state; and making an instruction to manufacture or fabricate a new machine.

According to this, likewise, since the remaining amount and the like of a consumable article in the machine are managed based on the unique information on the machine, an instruction to manufacture or fabricate a new machine can be made based on the information.

Further, the machine managing method of the present invention may include the steps of:

registering information on the service receiver for the machine; and relating the unique information on the machine to the information on the service receiver.

According to this, since the unique information on the machine and the information on the service receiver are managed in association, only the unique information on the machine needs be obtained from the machine, which reduces amounts of information and communication time.

Further, the machine managing method of the present invention may include the steps of:

provisionally registering unique information on the new machine in relation to the information on the service receiver; and if the unique information on the machine is obtained from the service receiver via the network, formally registering the unique information on the new machine in relation to the information on the service receiver.

According to this, the issuing of the unique information on the machine and the updating of the managing table are provisionally registered in an action where, for example, a replacement dispatched for the machine when the machine sends information that the machine will likely not be able to continuously used, such as near-emptiness information, and the information is received; therefore, for example, if the service receiver notifies of cancellation of the contract upon delivery, a lead time is allowed for in delivery, charging, and other processes. Further, receiving the unique information on the delivered machine via the network confirms that the machine is used by the service receiver. Therefore, the delivery of the machine can be confirmed when the information is received, and a formal registration can be done.

Further, the machine managing device of the present invention may include:

a first storage unit for registering unique information on a machine of a service receiver;

communications unit for detecting information on a remaining amount of a consumable article in the machine via a network; and a processing unit for, when the remaining amount of the consumable article has reached a specified value, making an instruction to dispatch a new machine to the service receiver.

According to this, by managing unique information on the machine in advance, the machine to be covered in the management can be arbitrarily managed. If, for example, the machines are manufactured on an OEM basis, and the unique information on the machines is managed without separating those OEM products from internally manufactured products, it becomes easier to service only the internally manufactured ones. It also becomes easier to selectively service only those machines manufactured in a certain period.

Incidentally, according to a method whereby the information is sent only when the machine detects near-emptiness by itself, the machine managing device can make an instruction to dispatch a new machine only in response to reception of the information. Further, the dispatch instruction may replaced with an instruction to request manufacture or fabrication of a machine to a machine's manufacturing division.

Further, the machine managing device of the present invention may be include a second storage unit for registering information on the service receiver, wherein the processing unit provisionally registers the unique information of the dispatched machine in relation to the information on the service receiver, and when the unique information on the machine is obtained from the service receiver via the network, formally registers the unique information of the new machine in relation to the information on the service receiver to calculate a charge for the formally registered machine.

According to this, the service receiver can be identified only by receiving the unique information on the machine, and therefore, information can be obtained on, for example, the destination of the delivery.

Further, even when the unique information on the machine is obtained from the service receiver via the network, the provision of a provisional registration period during which the service receiver can cancel the contract for the service, etc. allows for consideration during that period. Meanwhile, the service provider can carry out a charging process after the registration period, and therefore can collect charges for sure.

Further, the machine managing system of the present invention is a managing system of managing a machine connected to a network for a service receiver, and may include:

a group including a machine including: a transmission unit for externally transmitting via the network unique information on the machine and information that the machine is in a near-empty state of a consumable article; and a controller unit for controlling the transmission unit; and a terminal including: a communications unit for communicating with the group; a first storage unit for registering the information on the machine in the group; an input unit for feeding information on a consumed amount of the consumable article in the machine; and a processing unit for, when the consumed amount of the consumable article has reached a specified value, making an instruction to dispatch a new machine to the group.

According to this, the aforementioned machine managing method can be executed by means of a network system, remaining amount sensor, and other information technology. Further, based on the fact that the machine in the group has been connected to a network, it can be determined that the service receiver has used the machine. Further, if a pirated version of the machine is in use, the machine operates to transmit the unique information provided to the machine, and by checking the information, those machines with no unique information can be eradicated.

Further, the machine managing system of the present invention may be such that the processing unit provisionally registers the unique information on the machine dispatched to the group in relation to the information on the service receiver, and when the unique information on the machine is obtained via the network, formally registers the unique information on the new machine in relation to the information on the service receiver to calculate a charge for the formally registered machine.

According to this, since the obtainment of the unique information on the machine is detected by the connection of the machine to the network, receiving the information can be considered the use of the machine and employed as a charging time.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A machine managing method of managing a machine for a service receiver, the machine being a device main body which operates using a consumable article, said method causing a programmed computer to execute the steps of:

obtaining unique information on the machine by which the machine is identified and information on a remaining amount of the consumable article used in the machine and subsequently determining whether or not the remaining amount of the consumable article has reached a specified value; and if the remaining amount has reached the specified value, making an instruction to dispatch a new machine to the service receiver who matches the unique information on the machine.

2. The machine managing method as defined in claim 1, further comprising the step of when the unique information on the machine is obtained, accessing storage means on which the unique information on the machine is stored in association with information on the service receiver, so as to relate the unique information on the machine to the information on the service receiver.

3. A machine managing program for causing a computer to execute the machine managing method as defined in claim 2.

4. A machine used in the machine managing method as defined in claim 1.

5. A machine as defined in claim 4, which forms an image on a recording medium using the consumable article.

6. A machine as defined in claim 5, which forms an image on the recording medium by transferring the consumable article, which is toner, onto the recording medium.

7. A machine as defined in claim 5, which forms an image on the recording medium by discharging the consumable article, which is ink, onto the recording medium.

8. A machine as defined in claim 5, which operates as a printer.

9. A machine as defined in claim 5, which operates as a copying machine.

10. A machine as defined in claim 5, which operates as a facsimile machine.

11. A machine managing program for causing a computer to execute the machine managing method as defined in claim 1.

12. The machine managing method of claim 1, wherein the machine is an image forming machine.

13. A machine managing method of managing a machine for a service receiver, said method causing a programmed computer to execute the steps of:
- obtaining unique information on the machine by which the machine is identified and information on a remaining amount of a consumable article used in the machine and subsequently determining whether or not the remaining amount of the consumable article has reached a specified value;
- if the remaining amount has reached the specified value, making an instruction to dispatch a new machine to the service receiver who matches the unique information on the machine;
- when the unique information on the machine is obtained, accessing storage means on which the unique information on the machine is stored in association with information on the service receiver, so as to relate the unique information on the machine to the information on the service receiver;
- provisionally registering unique information to be assigned to the new machine on the storage means in relation to the information on the service receiver; and
- if the unique information on the machine is obtained from the service receiver, formally registering the unique information on the machine on the storage means in relation to the information on the service receiver.

14. The machine managing method as defined in claim 13, further comprising the step of calculating a charge for the formally registered machine.

15. A machine managing program for causing a computer to execute the machine managing method as defined in claim 14.

16. The machine managing method as defined in claim 13, wherein
- in the provisional registration step, when information that the machine would not be continuously operable is received from the machine, the new machine is dispatched as a replacement and the unique information on the machine is provisionally registered.

17. The machine managing method as defined in claim 16, wherein
- the information that the machine would not be continuously operable is information that the remaining amount of the consumable article used in the machine is in a near-empty state.

18. A machine managing program for causing a computer to execute the machine managing method as defined in claim 13.

19. A machine managing method of managing a machine for a service receiver, the machine being a device main body which operates using a consumable article, said method causing a programmed computer to execute the steps of:
- obtaining unique information on the machine by which the machine is identified and information on a remaining amount of a the consumable article used in the machine and subsequently determining whether or not the remaining amount of the consumable article has reached a specified value; and
- if the remaining amount has reached the specified value, making an instruction to manufacture or fabricate a new machine.

20. The machine managing method as defined in claim 19, further comprising the step of
- when the unique information on the machine is obtained, accessing storage means on which the unique information on the machine is stored in association with information on the service receiver, so as to relate the unique information on the machine to the information on the service receiver.

21. A machine used in the machine managing method as defined in claim 19.

22. The machine managing method of claim 19, wherein the machine is an image forming machine.

23. A machine managing method of managing a machine for a service receiver, said method causing a programmed computer to execute the steps of:
- obtaining unique information on the machine by which the machine is identified and information on a remaining amount of a consumable article used in the machine and subsequently determining whether or not the remaining amount of the consumable article has reached a specified value;
- if the remaining amount has reached the specified value, making an instruction to manufacture or fabricate a new machine;
- when the unique information on the machine is obtained, accessing storage means on which the unique information on the machine is stored in association with information on the service receiver, so as to relate the unique information on the machine to the information on the service receiver;
- provisionally registering unique information to be assigned to the new machine on the storage means in relation to the information on the service receiver; and
- if the unique information on the machine is obtained from the service receiver, formally registering the unique information on the machine on the storage means in relation to the information on the service receiver.

24. The machine managing method as defined in claim 23, further comprising the step of
- calculating a charge for the formally registered machine.

25. The machine managing method as defined in claim 23, wherein
- in the provisional registration step, when information that the machine would not be continuously operable is received from the machine, the new machine is dispatched as a replacement and the unique information on the machine is provisionally registered.

26. The machine managing method as defined in claim 25, wherein
- the information that the machine would not be continuously operable is information that the remaining amount of the consumable article used in the machine is in a near-empty state.

27. A machine managing method of managing a machine for a service receiver over a network, the machine being a device main body which operates using a consumable article, said method causing a programmed computer to execute the steps of:
- obtaining, via a network, unique information on the machine by which the machine is identified and information that a remaining amount of the consumable article used in the machine is in a near-emptiness state; and
- making an instruction to dispatch a new machine to the service receiver who matches the unique information on the machine, in accordance with execution of the previous step.

28. The machine managing method as defined in claim 27, further comprising the step of when the unique information on the machine is obtained, accessing storage means on which the unique information on the machine is stored in association with information on the service receiver, so as to relate the unique information on the machine to the information on the service receiver.

29. A machine used in the machine managing method as defined in claim 27.

30. The machine managing method of claim 27, wherein the machine is an image forming machine.

31. A machine managing method of managing a machine for a service receiver over a network, said method causing a programmed computer to execute the steps of:

obtaining, via a network, unique information on the machine by which the machine is identified and information that a remaining amount of a consumable article used in the machine is in a near-emptiness state;

making an instruction to dispatch a new machine to the service receiver who matches the unique information on the machine, in accordance with execution of the previous step;

when the unique information on the machine is obtained, accessing storage means on which the unique information on the machine is stored in association with information on the service receiver, so as to relate the unique information on the machine to the information on the service receiver;

provisionally registering unique information to be assigned to the new machine on the storage means in relation to the information on the service receiver; and if the unique information on the machine is obtained from the service receiver, formally registering the unique information on the machine on the storage means in relation to the information on the service receiver.

32. The machine managing method as defined in claim 31, further comprising the step of calculating a charge for the formally registered machine.

33. The machine managing method as defined in claim 31, wherein in the provisional registration step, when information that the machine would not be continuously operable is received from the machine, the new machine is dispatched as a replacement and the unique information on the machine is provisionally registered.

34. The machine managing method as defined in claim 33, wherein the information that the machine would not be continuously operable is information that the remaining amount of the consumable article used in the machine is in a near-empty state.

35. A machine managing method of managing a machine for a service receiver over a network, the machine being a device main body which operates using a consumable article, said method causing a programmed computer to execute the steps of:

obtaining, via a network, unique information on the machine by which the machine is identified and information that a remaining amount of the consumable article used in the machine is in a near-emptiness state; and making an instruction to manufacture or fabricate a new machine in accordance with execution of the previous step.

36. The machine managing method as defined in claim 35, further comprising the step of when the unique information on the machine is obtained, accessing storage means on which the unique information on the machine is stored in association with information on the service receiver, so as to relate the unique information on the machine to the information on the service receiver.

37. A machine used in the machine managing method as defined in claim 35.

38. The machine managing method of claim 35, wherein the machine is an image forming machine.

39. A machine managing method of managing a machine for a service receiver over a network, said method causing a programmed computer to execute the steps of:

obtaining, via a network, unique information on the machine by which the machine is identified and information that a remaining amount of a consumable article used in the machine is in a near-emptiness state;

making an instruction to manufacture or fabricate a new machine in accordance with execution of the previous step;

when the unique information on the machine is obtained, accessing storage means on which the unique information on the machine is stored in association with information on the service receiver, so as to relate the unique information on the machine to the information on the service receiver;

provisionally registering unique information to be assigned to the new machine on the storage means in relation to the information on the service receiver; and if the unique information on the machine is obtained from the service receiver, formally registering the unique information on the machine on the storage means in relation to the information on the service receiver.

40. The machine managing method as defined in claim 39, further comprising the step of calculating a charge for the formally registered machine.

41. The machine managing method as defined in claim 39, wherein in the provisional registration step, when information that the machine would not be continuously operable is received from the machine, the new machine is dispatched as a replacement and the unique information on the machine is provisionally registered.

42. The machine managing method as defined in claim 41, wherein the information that the machine would not be continuously operable is information that the remaining amount of the consumable article used in the machine is in a near-empty state.

43. A machine managing method of managing a machine for a service receiver, the machine being a device main body which operates using a consumable article, said method causing a programmed computer to execute the steps of:

obtaining unique information on the machine by which the machine is identified and information on a remaining amount of a the consumable article used in the machine and subsequently determining whether or not the remaining amount of the consumable article has reached a specified value; and if the remaining amount has reached the specified value, making an instruction to supply a new machine to the service receiver who matches the unique information on the machine.

44. The machine managing method as defined in claim 43, wherein:

the information on a remaining amount of a consumable article used in the machine is information on an amount of the consumable article consumed in the machine; and in the step of determining whether or not the specified value has been reached, the information is always obtained, the remaining amount of the consumable article is calculated every time the information is obtained, and it is determined based on a result of the calculation whether or not the remaining amount of the consumable article has reached the specified value.

45. The machine managing method as defined in claim 43, wherein:

the information on a remaining amount of a consumable article used in the machine is information that the remaining amount of the consumable article used in the machine is in a near-empty state; and in the step of determining whether or not the specified value has been reached, the information is obtained only when the remaining amount of the consumable article is in a near-empty state, and it is determined, based on whether or not the information is obtained, whether or not the remaining amount of the consumable article has reached the specified value.

46. The machine managing method of claim 43, wherein the machine is an image forming machine.

47. A machine used in a machine managing method of managing a machine for a service receiver, said method causing a programmed computer to execute the steps of:

obtaining unique information on the machine by which the machine is identified and information on a remaining amount of a consumable article used in the machine and subsequently determining whether or not the remaining amount of the consumable article has reached a specified value; and if the remaining amount has reached the specified value, making an instruction to dispatch a new machine to the service receiver who matches the unique information on the machine, wherein the machine forms an image on a recording medium using the consumable article, and which forms an image on the consumable article, which is heat-sensitive material, by heating the consumable article in accordance with data.

48. A machine managing device, comprising:

a storage unit for registering unique information, on a machine to be delivered to a service receiver, by which the machine is identified in association with the service receiver; and a processing unit for determining, when the unique information on the machine and information on a remaining amount of a consumable article used in the machine are obtained, whether or not the remaining amount of the consumable article has reached a specified value and for making, when the remaining amount of the consumable article has reached the specified value, an instruction to dispatch a new machine to the service receiver who matches the unique information on the machine.

49. The machine managing device as defined in claim 48, wherein the processing unit provisionally registers unique information to be assigned to the machine to be delivered on the storage unit in relation to the service receiver, and when the unique information on the machine is obtained from the service receiver, formally registers the unique information on the machine on the storage unit in relation to the service receiver and calculates a charge for the formally registered machine.

50. The machine managing device as defined in claim 48, wherein the processing unit calculates the charge for the machine if the unique information assigned to the machine is not obtained from the service receiver for a period after the dispatch of the machine to the service receiver.

51. A machine managing device, comprising:

a storage unit for registering unique information, on a machine to be delivered to a service receiver, by which the machine is identified in association with the service receiver;

a communications unit for receiving the unique information on the machine and information that a near-empty state has been reached from a group including the machine; and a processing unit for making, when the information that a near-empty state has been reached is received, an instruction to dispatch a new machine to the service receiver who matches the unique information on the machine.

52. The machine managing device as defined in claim 51, wherein the processing unit provisionally registers unique information to be assigned to the machine to be delivered on the storage unit in relation to the service receiver, and when the unique information on the machine is obtained from the service receiver, formally registers the unique information on the machine on the storage unit in relation to the service receiver and calculates a charge for the formally registered machine.

53. The machine managing device as defined in claim 51, wherein the processing unit calculates the charge for the machine if the unique information assigned to the machine is not obtained from the service receiver for a period after the dispatch of the machine to the service receiver.

54. A machine managing system for managing a machine for a service receiver over a network, comprising:

a group including a machine including: a transmission unit for externally transmitting via a network unique information on the machine by which the machine is identified and information that a consumable article used in the machine is in a near-empty state; and a controller unit for controlling the transmission unit; and a machine managing device including: a communications unit for receiving from the group the unique information on the machine and the information that the consumable article is in a near-empty state; a storage unit for registering the unique information on the machine in the group in association with the service receiver; and a processing unit for making, when the information that the consumable article is in a near-empty state is received, an instruction to dispatch a new machine to the service receiver who matches the unique information on the machine.

55. A machine managing system for managing a machine for a service receiver over a network, comprising:

a group including a machine including: a transmission unit for externally transmitting via a network unique information on the machine by which the machine is identified and information on a remaining amount of a consumable article used in the machine; and a controller unit for controlling the transmission unit; and a machine managing device including: a communications unit for receiving from the group the unique information on the machine and the information on the remaining amount; a storage unit for registering the unique information on the machine in the group in association with the service receiver; and a processing unit for determining, when the unique information on the machine and the information on the remaining amount of the consumable article used in the machine are obtained, whether or not the remaining amount of the consumable article has reached a specified value and for making, when the remaining amount of the consumable article has reached the specified value, an instruction to dispatch a new machine to the service receiver who matches the unique information on the machine.

* * * * *